United States Patent
Dodani et al.

(10) Patent No.: US 11,946,829 B2
(45) Date of Patent: Apr. 2, 2024

(54) TIRE SENSOR DEVICE

(71) Applicant: REVVO TECHNOLOGIES, INC., San Mateo, CA (US)

(72) Inventors: Sunjay Dodani, San Francisco, CA (US); Wing-Hong Andrew Ko, Mountain View, CA (US)

(*) Notice: Subject to any disclaimer, the term of this patent is extended or adjusted under 35 U.S.C. 154(b) by 0 days.

(21) Appl. No.: 17/267,757

(22) PCT Filed: Aug. 12, 2019

(86) PCT No.: PCT/US2019/046133
§ 371 (c)(1),
(2) Date: Feb. 10, 2021

(87) PCT Pub. No.: WO2020/036859
PCT Pub. Date: Feb. 20, 2020

(65) Prior Publication Data
US 2021/0181063 A1 Jun. 17, 2021

Related U.S. Application Data

(60) Provisional application No. 62/717,887, filed on Aug. 12, 2018.

(51) Int. Cl.
*G01M 17/02* (2006.01)
*B60C 11/24* (2006.01)
(Continued)

(52) U.S. Cl.
CPC ............ *G01M 17/02* (2013.01); *B60C 11/246* (2013.01); *B60C 23/0479* (2013.01);
(Continued)

(58) Field of Classification Search
CPC ............ B60C 23/0435; B60C 23/0416; B60C 23/0489; B60C 23/0488; B60C 23/0415;
(Continued)

(56) References Cited

U.S. PATENT DOCUMENTS 4,045,738 A * 8/1977 Buzzell .................. G01P 3/488
335/229
5,355,924 A * 10/1994 Olney ................... B60C 23/133
417/233
(Continued)

FOREIGN PATENT DOCUMENTS

DE    102005052476 A1 * 5/2007 ............. B60C 11/24
EP        1711354 B1 * 4/2009 ......... B60C 23/0416
(Continued)

OTHER PUBLICATIONS

Revvo Technologies, Inc., PCT/US19/46133, International Search Report and Written Opinion, dated Dec. 12, 2019, 11 pgs.

*Primary Examiner* — Mischita L Henson
*Assistant Examiner* — Gedeon M Kidanu

(57) ABSTRACT

A tire sensor device for monitoring a condition of a tire includes a plurality of sensors including a temperature sensor and an accelerometer. The tire sensing device further includes memory configured to store data received by the plurality of sensors and one or more processors coupled with the memory. The one or more processors are configured to perform one or more initial processing operations on the data received by the plurality of sensors. The tire sensor device further includes an antenna, coupled with the one or more processors, configured to wirelessly communicate with one or more external devices.

15 Claims, 15 Drawing Sheets

(51) Int. Cl.
*B60C 23/04* (2006.01)
*G01L 17/00* (2006.01)
*G01M 3/00* (2006.01)

(52) U.S. Cl.
CPC ...... *B60C 23/0488* (2013.01); *B60C 23/0493* (2013.01); *G01L 17/00* (2013.01); *G01M 3/00* (2013.01)

(58) Field of Classification Search
CPC ............ B60C 23/0447; B60C 23/0494; B60C 23/062; B60C 23/0457; B60C 23/0459; B60C 23/0466; B60C 23/0471; B60C 23/0486; B60C 23/0408; B60C 23/20; B60C 23/0493; B60C 11/24; B60C 23/0401; B60C 23/0433; B60C 11/246; B60C 23/001; B60C 23/003; B60C 23/007; B60C 23/008; B60C 23/009; B60C 23/02; B60C 23/041; B60C 23/0413; B60C 23/0423; B60C 23/0461; B60C 23/0496; B60C 23/0498; B60C 23/061; B60G 2800/984; B60T 2240/06; B60T 2240/07; B60T 2240/08; E01F 9/696; F16D 2066/001; H02S 10/12; H02S 20/21; H02S 20/22; G01L 17/00; G01L 17/005; G01L 19/0092; G01L 19/08; G01L 19/083; G01L 19/086; G01L 5/28; G01L 7/166; G01B 11/22; G01B 2210/50; G01B 5/18; G01M 17/02; G01M 17/027; G01M 17/013; G02F 1/31; G02F 2203/12

See application file for complete search history.

(56) References Cited

U.S. PATENT DOCUMENTS

| | | | | |
|---|---|---|---|---|
| 6,105,423 | A * | 8/2000 | Prottey | B60C 23/0493 73/146.5 |
| 7,536,903 | B2 * | 5/2009 | Schillinger | B60C 23/0488 701/1 |
| 7,730,772 | B2 * | 6/2010 | Cook | B60C 23/0496 73/717 |
| 2007/0191996 | A1 * | 8/2007 | Bondu | B60C 23/0408 701/1 |
| 2018/0158260 | A1 * | 6/2018 | Dudar | B62D 6/002 |

FOREIGN PATENT DOCUMENTS

| | | | | |
|---|---|---|---|---|
| EP | 1711354 | B1 | 4/2009 | |
| EP | 2266203 | B1 * | 5/2012 | ........... H03F 3/2175 |
| EP | 2266203 | B1 | 5/2012 | |

* cited by examiner

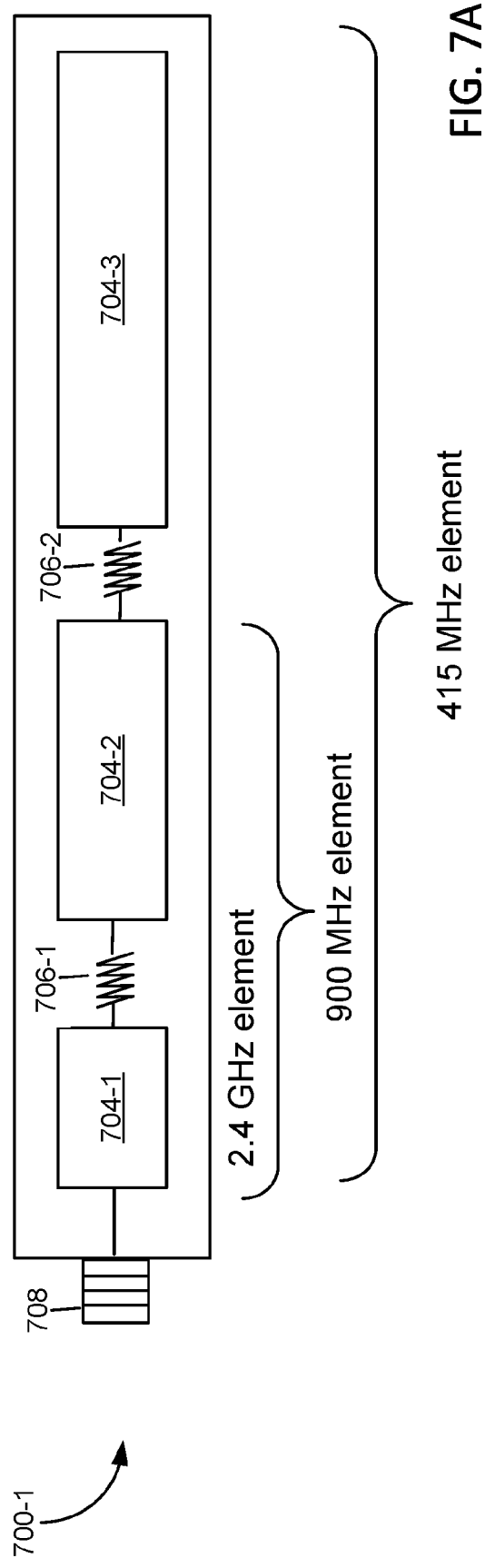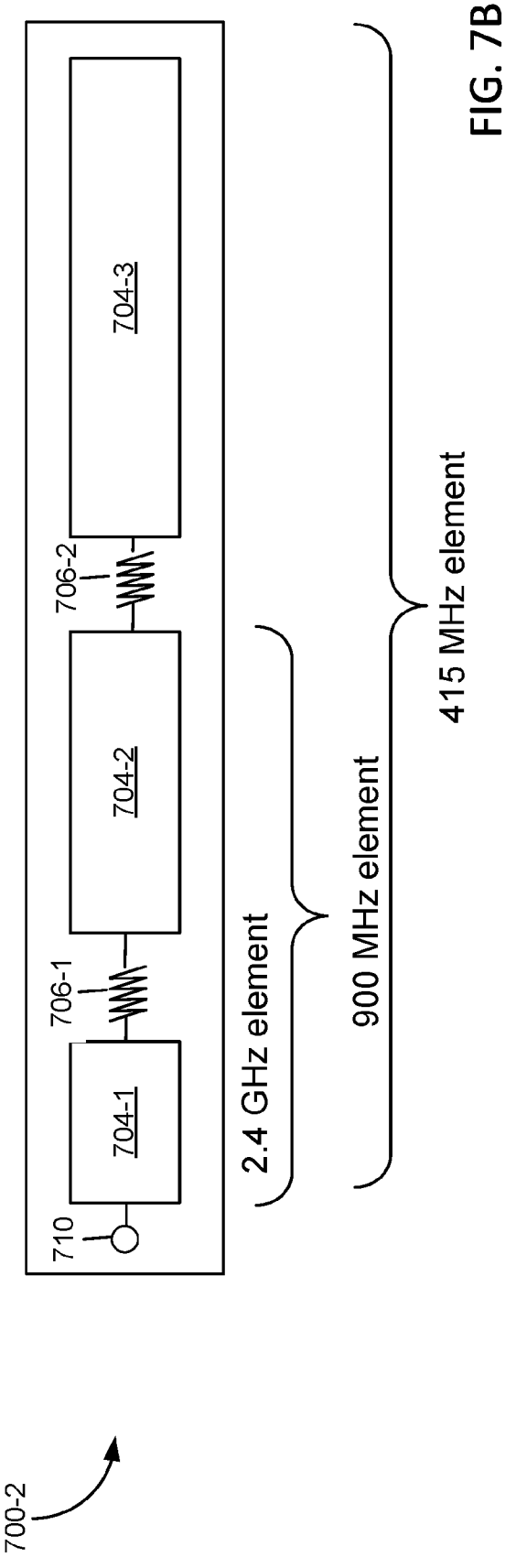
FIG. 7A
FIG. 7B

900

Receive data from a plurality of sensors disposed within a tire, wherein:
    the plurality of sensors include a microphone, a temperature sensor, and an accelerometer; and
    the data from the plurality of sensors are acquired at a frequency greater than a frequency of rotation of the tire. ⸺902

Determine one or more characteristics of the tire using the data from the plurality of sensors acquired at the frequency greater than the frequency of rotation of the tire. The one or more characteristics of the tire are selected from the group consisting of:
    a wheel misalignment;
    a slow leak;
    a puncture;
    rubber decay;
    low tread depth;
    excessive load; and
    a mileage limit exceeded. ⸺904

Provide a user alert indicating the one or more characteristics of the tire. ⸺906

FIG. 9

TIRE SENSOR DEVICE

RELATED APPLICATIONS

This Application is a United States National Stage Application filed under 35 U.S.C. § 371 of PCT Patent Application Serial No. PCT/US2019/046133 filed on Aug. 12, 2019, which claims the benefit of and priority to U.S. Provisional Application No. 62/717,887 filed on Aug. 12, 2018, and titled, "Sensor Module and System for Determining Driving Conditions and Tire Degradation," each of which is hereby incorporated by reference in its entirety.

TECHNICAL FIELD

The disclosed embodiments relate generally to a tire sensor device for determining driving conditions and tire degradation, and more specifically to a tire sensor device adapted to be disposed on the inner surface of a tire tread.

BACKGROUND

Tire wear and maintenance are critical aspects of vehicle safety. As the tire is worn, driver safety and performance are compromised.

However, tire tread wear has generally been a subjective measurement performed by professionals associated with the tire-installation process. One technology for monitoring a tire is the tire pressure monitoring sensor (TPMS). TPMS was developed to monitor the pressure in a tire and alert the driver of the vehicle to below-standard pressure.

SUMMARY

The present disclosure provides a tire sensor device for monitoring a condition of a tire. The tire sensor device includes a plurality of sensors including, optionally, a microphone, a temperature sensor, and an accelerometer. The tire sensor device further includes memory configured to store data (e.g., measurements) received by the plurality of sensors. The tire sensor device further includes a microprocessor coupled with the memory. The microprocessor is configured to perform one or more initial processing operations on the data received by the plurality of sensors. The one or more initial processing operations include determining one or more tire characteristics using data from the plurality of sensors acquired at a frequency greater than a frequency of rotation of the tire. The tire sensor device further includes an antenna, coupled with the microprocessor, configured to wirelessly communicate with one or more external devices (note, however, that the antenna may be separate from and communicatively coupled with the tire sensor device). The tire sensor device has dimensions less than 5 cm×5 cm×2 cm.

Further, the present disclosure provides another tire sensor device for monitoring a condition of a tire. The tire sensor device includes a plurality of sensors including, optionally, a microphone, a temperature sensor, and an accelerometer. The tire sensor device further includes memory configured to store data received by the plurality of sensors. The tire sensor device further includes one or more processors coupled with the memory. The one or more processors are configured to perform one or more initial processing operations on the data received by the plurality of sensors. The tire sensor device further includes an antenna, coupled with the one or more processors, configured to wirelessly communicate with one or more external devices (note, however, that the antenna may be separate from and communicatively coupled with the tire sensor device).

Further, the present disclosure provides a method of alerting a user to changes in tire characteristics. The method includes receiving data from a plurality of sensors disposed within a tire. The plurality of sensors include, optionally, a microphone, a temperature sensor, and an accelerometer. The data from the plurality of sensors are acquired at a frequency greater than a frequency of rotation of the tire. The method includes determining one or more characteristics of the tire using the data from the plurality of sensors acquired at a frequency greater than a frequency of rotation of the tire, the one or more characteristics of the tire selected from the group consisting of: a wheel misalignment; a slow leak; a puncture; rubber decay; low tread depth; excessive load; and a mileage limit exceeded. The method further includes providing a user alert indicating the one or more characteristics of the tire.

Further, the present disclosure provides a method of monitoring tire conditions for a plurality of vehicles (e.g., a fleet of vehicles). The method includes receiving information from the plurality of vehicles indicating presence or absence of a plurality of tire conditions, including one or more tire conditions selected from the group consisting of: wheel misalignment; a slow leak; a puncture; rubber decay; low tread depth; excessive load; and a mileage limit exceeded. The method further includes displaying a dashboard summary of the one or more tire conditions for the plurality of vehicles.

Further, some embodiments provide a computer system that includes one or more processors, memory, and optionally a display. The memory (e.g., a non-transitory computer-readable storage medium) stores instructions for execution by the one or more processors, including instructions for performing any of the methods described herein.

Further, some embodiments provide a non-transitory computer readable storage medium storing instructions, which, when executed by a computer system that includes one or more processors and optionally a display, causes the computer system to perform any of the methods described herein.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 7A-7C are schematic diagrams of antennas for use in a tire sensor device, in accordance with some embodiments.

FIG. 9 is a flow diagram of a method for providing a user alert indicating one or more characteristics of a tire, in accordance with some embodiments.

DETAILED DESCRIPTION

Some embodiments of the present disclosure provide a tire sensor device (e.g., a sensor board and/or a packaged) that is adapted to be mounted to a tire without invasive mounting requirements. The tire sensor device includes a plurality of sensors beyond a TPMS, including, optionally, a high-frequency accelerometer, a microphone, and/or a temperature sensor. The tire sensor device is further adapted to capture, measure, and analyze data from the tire using the plurality of sensors. The data may be transmitted to a server, which may analyze the data to quantify and characterize the effects of various external factors. These factors include, but are not limited to, road conditions, driver behavior, and environmental changes. By using a high-frequency accelerometer, for example, characteristics of individual rotations of each tire (e.g., the tires "footprint") can be determined. Tire conditions and degradation, such as rubber decay and/or low tread, can be identified by quantifying, characterizing, and removing the effects of external factors (e.g., road conditions).

The present disclosure also provides methods and devices for alerting users to changes in tire conditions and/or providing dashboard summaries of tire conditions for a fleet of vehicles.

Thus, systems are provided with improved methods for detecting and reporting tire degradation in one or more vehicles. These systems and methods use an unconventional combination of measurement apparatuses (e.g., sensors) to improve safety, performance, and efficiency (e.g., fuel and/or energy economy) of vehicles by improving tire maintenance.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
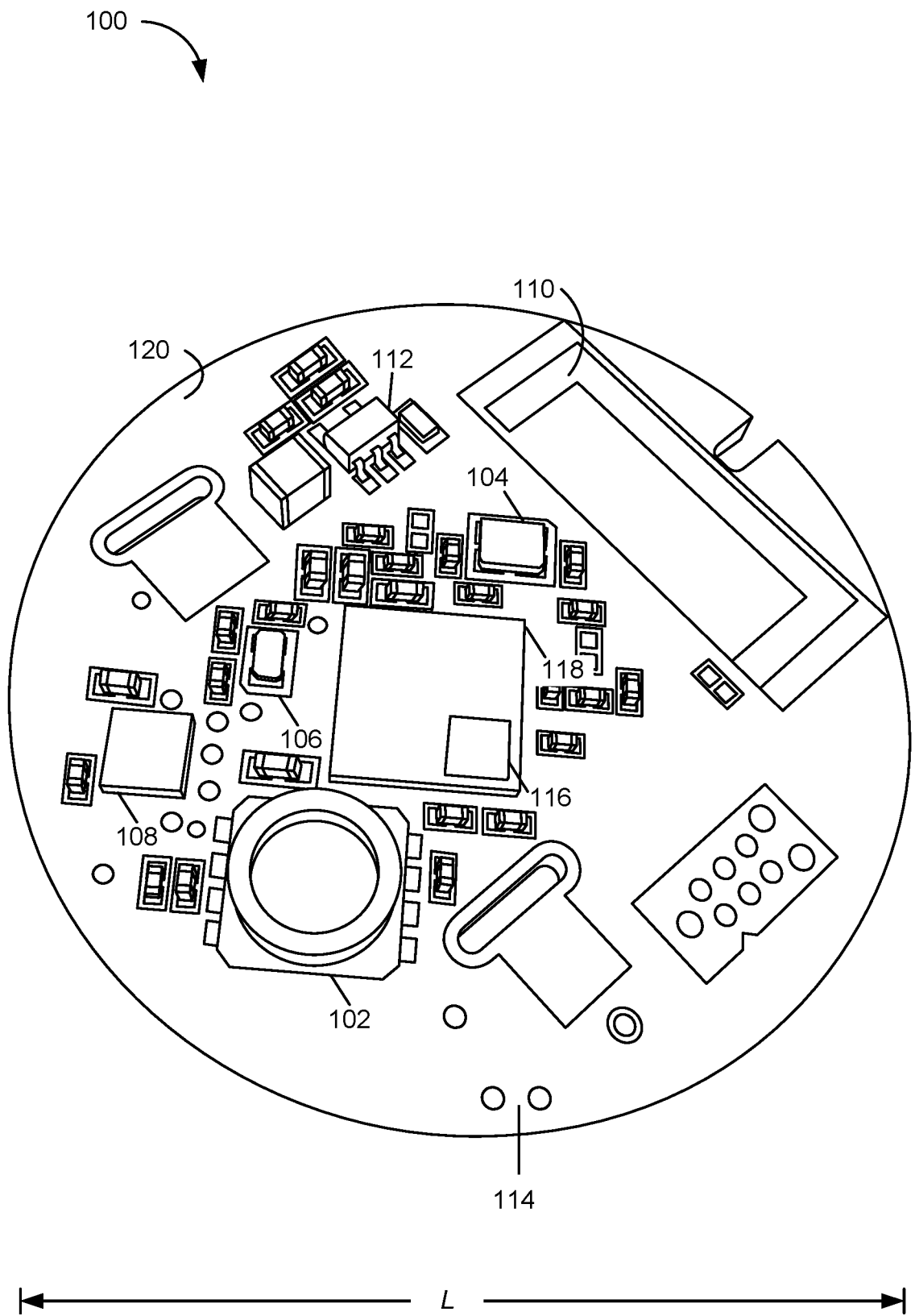
FIG. 1 is an illustration of a sensor board of a tire sensor device, in accordance with some embodiments.

FIG. 1 is an illustration of a sensor board 100 of a tire sensor device, in accordance with some embodiments. The sensor board 100 has several components, including but not limited to a pressure sensor 102, a microphone 104, a temperature sensor 106, an accelerometer 108, an antenna 110, a voltage regulator 112, an analog input 114, memory 116, and one or more processors 118. The various sensors are configured to collect data and supply the data to the memory 116 and/or one or more processors 118. In some embodiments, the several components including the various sensors are affixed to a common (i.e., the same) polychlorinated biphenyl (PCB) board 120 (e.g., the various sensors have a fixed position with respect to one another). In some embodiments, the PCB board 120 has printed thereon wires to connect the several components to one another. Note that, in various embodiments, any of the aforementioned sensors may be omitted. For example, in some embodiments, sensor board 100, or a tire sensor device that includes sensor board 100, does not include a microphone, does not includes a temperature sensors, and/or does not include an accelerometer.

In some embodiments, any or all of the sensors described herein have a sampling rate sufficient to acquire data (e.g., measurements) at a frequency greater than a frequency of rotation of the tire (e.g., at a predefined speed and for a predefined tire size and/or circumference). For example, in some embodiments, the tire sensor device is adapted to operate (e.g., acquire multiple samples per wheel rotation from one or more of the sensors or each of the sensors) at speeds up to 120 miles per hour (mph) in a P215/60R16 tire.

In some embodiments, sensor board 100 has a characteristic length L (e.g., a maximum length in any particular direction) that is less than 5 centimeters (cm). For example, in some embodiments, sensor board 100 has a diameter that is approximately 3.4 cm.

In some embodiments, the pressure sensor 102 is adapted to capture and/or measure the pressure of a tire to which the sensor board 100 is affixed. For example, the pressure sensor 102 may be part number MS580305BA01-00 (MS5803-05BA), manufactured by TE CONNECTIVITY.

In some embodiments, the microphone 104 is adapted to capture changes in frequency, for example, as the tire is driven on a road surface. For example, the microphone 104 may be part number ICS-41350, manufactured by INVENSENSE.

In some embodiments, the temperature sensor 106 is adapted to measure temperature variation within and/or proximate to the tire, for example, as the tire is driven on a road surface. For example, the temperature sensor 106 may be part number TMP102-Q1, manufactured by TEXAS INSTRUMENTS.

In some embodiments, the accelerometer 108 is adapted to detect and/or measure changes in the motion of the tire, for example, as the tire is driven on a road surface. For example, the accelerometer 108 may be part number ADXL372, manufactured by ANALOG DEVICES. In some embodiments, the accelerometer has a sampling rate of at least 3000 Hertz (Hz) (or 4000 Hz or 5000 Hz). In some embodiments, the accelerometer 108 has a sampling rate of 6400 Hz. In some embodiments, the accelerometer 108 has a sampling rate sufficient to acquire data (e.g., measurements) at a frequency greater than a frequency of rotation of the tire (e.g., at a predefined speed and for a predefined tire size and/or predefined circumference). For example, in some embodiments, the tire sensor device is adapted to operate (e.g., acquire multiple samples per wheel rotation) at speeds up to 120 miles per hour (mph) in a P215/60R16 tire.

In some embodiments, the antenna 110 (e.g., a radio frequency (RF) antenna) is adapted to transmit data from the sensor board. For example, the antenna may be a printed on-board antenna. In some embodiments, the antenna 110 is adapted to communicate in an industrial, scientific and medical (ISM) radio band. In some embodiments, as described in greater detail with reference to FIGS. 7A-7C and FIG. 8, the antenna 110 is adapted to communicate over a plurality of bands (e.g., the antenna 110 is a multi-mode antenna). In some embodiments, the antenna 110 is adapted to communicate over BLUETOOTH (e.g., in a 2.4 GHz band). In some embodiments, antenna 110 is adapted to communicate over a 900 MHz Global System for Mobile Communications (GSM) band. In some embodiments, antenna 110 is adapted to communicate over a 415 MHz ISM band. In some embodiments, antenna 110 is an integral part of the tire sensor devices described herein (e.g., tire sensor device 200, FIG. 2). In some embodiments, an antenna is separate from and communicatively coupled to the tire sensor devices described herein.

In some embodiments, the voltage regulator 112 is adapted to regulate battery power (e.g., ensures that the antenna 110 receives a consistent voltage within specifications). Regulating the voltage to antenna 110 helps reduce transient noise in the signal sent from the antenna 110, reducing the overall power draw and improving efficiency. For example, the voltage regulator 112 may be part number TPS62740, manufactured by TEXAS INSTRUMENTS.

In some embodiments, the analog input 114 is adapted to receive inputs from off-board analog sensors such as to connect to data cables in order to download raw data from memory 116.

In some embodiments, the one or more processors 118 are adapted to analyze data stored in the memory 116 and/or received from one or more of the sensors on the sensor board. In some embodiments, the one or more processors 118 comprise one or more microprocessors (e.g., the microprocessor comprises one or more central processing units (CPUs) and/or general processing units (GPUs)). In some embodiments, the one or more processors 118 comprise one or more field programmable gate arrays (FPGAs). In some embodiments, the one or more processors 118 comprise one or more application specific integrated circuits (ASICs). In some embodiments, the one or more processors 118 are embodied as a system-on-chip (SoC) (e.g., part number nRF52832, or a similar part such as nRF52840, manufactured by NORDIC SEMICONDUCTOR). The nRF52832 is an ultra-low power multiprotocol SoC with hardware support on-chip for BLUETOOTH® 5. The nRF52832 may further includes near-field communication (NFC) capabilities.

In some embodiments, memory 116 is adapted to store data captured and/or generated by one or more sensors on the sensor board 100. In some embodiments, memory 116 includes high-speed random access memory, such as DRAM, SRAM, DDR RAM, or other random access solid-state memory devices; and may include non-volatile memory, such as one or more flash memory devices, or other non-volatile solid-state storage devices. Memory 116 optionally includes one or more storage devices remotely located from one or more processors 118. Memory 116, or, alternatively, the non-volatile solid-state memory device(s) within memory 116, includes a non-transitory computer-readable storage medium. In some embodiments, memory 116 comprises flash memory. For example, the flash memory may be part number W25N01GVZEIG TR (W25N01GV), manufactured by WINBOND ELECTRONICS. In some embodiments, memory 116 is packaged with the one or more processors 118 (e.g., as a single microprocessor).

Figure 3:
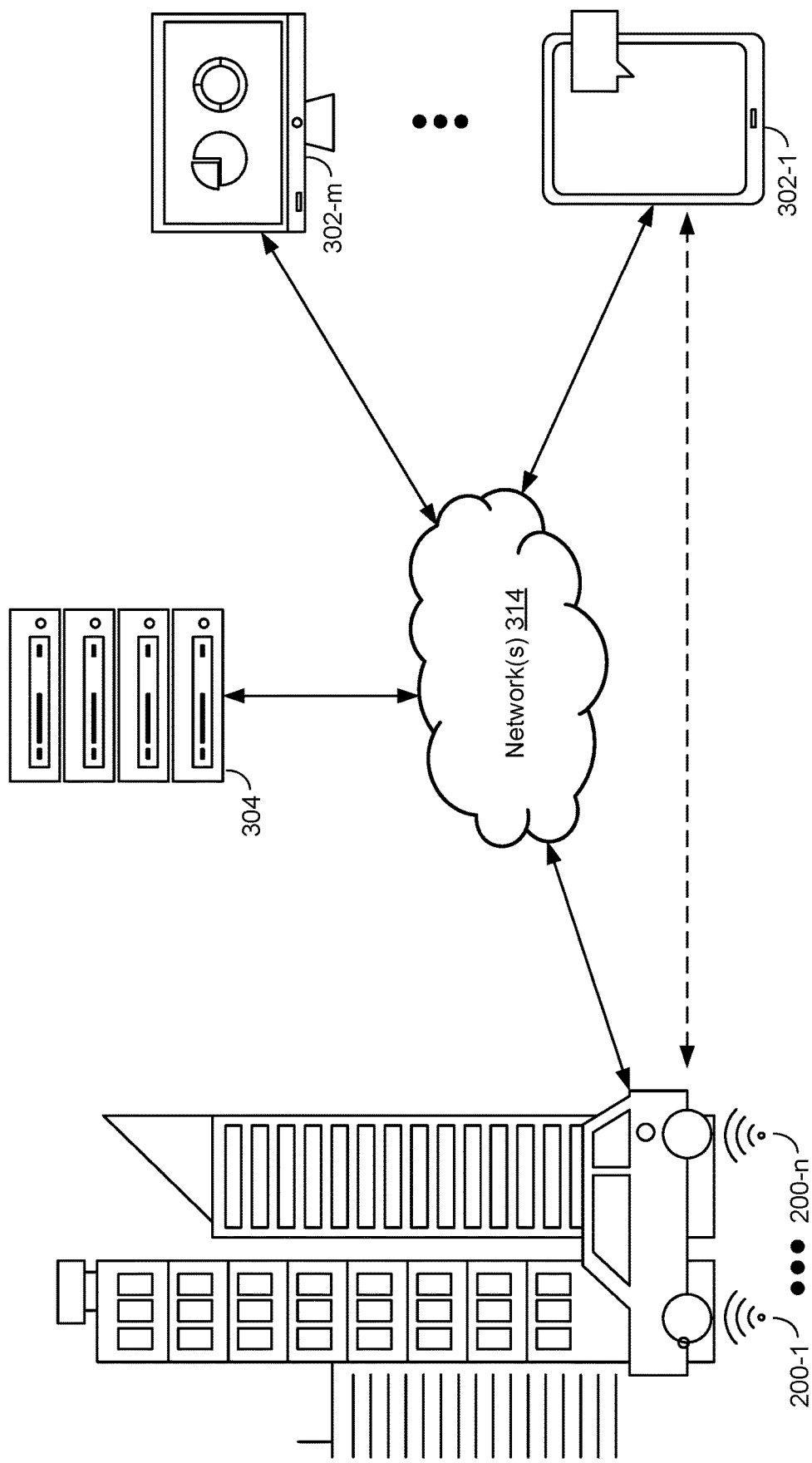
FIG. 3 is a block diagram illustrating a tire monitoring system, in accordance with some embodiments.

In some embodiments, the one or more processors 118 perform one or more initial processing operations on the data received by the plurality of sensors (e.g., before the data are transmitted to tire monitoring server 304, FIG. 3). For example, the one or more initial processing operations include determining one or more tire characteristics using data from the plurality of sensors acquired at a frequency greater than a frequency of rotation of the tire. In some embodiments, the one or more tire characteristics include a duration (e.g., length of time) of a rotation of the tire (e.g., a duration of every rotation of the tire); a length of a footprint of the tire (e.g., a length of a footprint of every rotation of the tire); a wheel misalignment; a slow leak; a puncture; rubber decay; low tread depth; excessive load; and a mileage limit exceeded. In some embodiments, the initial processing operations include identifying (e.g., and counting), using data from the plurality of sensors, a plurality of individual rotations of the tire. Alternatively, some of these operations may be performed by a device that receives data from sensor board 100 (e.g., tire monitoring server 304 and/or electronic device 302-1, FIG. 3).

Figure 2A:
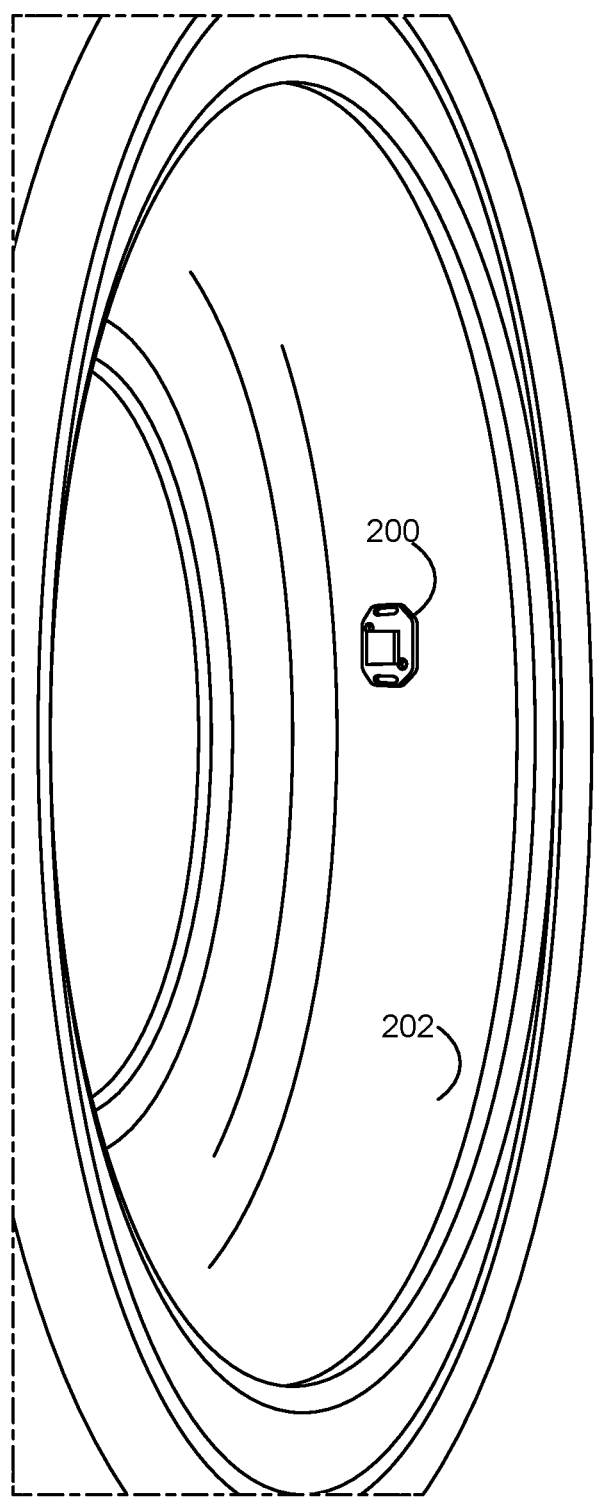
FIGS. 2A-2B illustrate a tire sensor device disposed on an inner surface of a tire opposite a tread, in accordance with some embodiments.
Figure 2B:
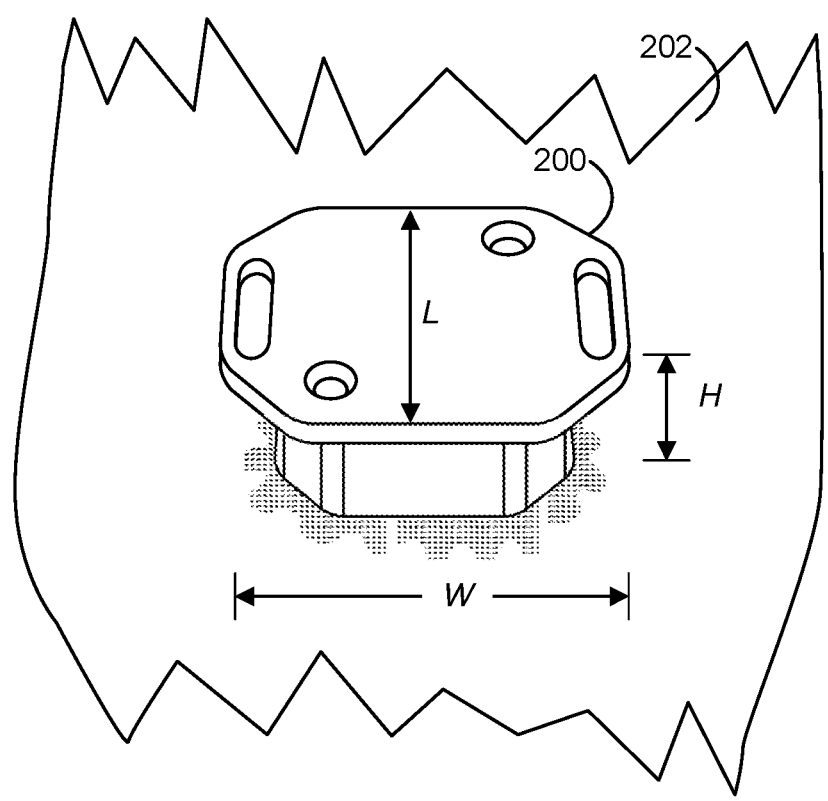

FIGS. 2A-2B illustrate a tire sensor device 200 disposed on an inner surface of a tire 202 opposite a tread, in accordance with some embodiments. In some embodiments, the tire sensor device 200 has dimensions less than 5 cm (e.g., in width W)×5 cm (e.g., in length L)×2 cm (e.g., in height H above the inner surface of the tire 202). In some embodiments, the tire sensor device 200 has dimensions less than 10 cm×10 cm×4 cm. In some embodiments, tire sensor device 200 incudes a plurality of sensors including a microphone, a temperature sensor, and an accelerometer (e.g., includes sensor board 100, FIG. 1). In some embodiments, tire sensor device 200 is configured to operate (e.g., obtain measurements from the plurality of sensors) while tire 202 is in use (e.g., while the vehicle is moving and the tire is pressurized to a pressure above 30 pounds per square inch (psi)).

As illustrated, the tire sensor device 200 is affixed to the inner surface of the tire. For example, the sensor may be affixed to the inner surface of the tire using an industrial strength epoxy. As a result, there is no need to modify the manufacturing process of the tire and no damage results from affixing the sensor module to the tire. The sensor module may be affixed to the tire in any other suitable, non-invasive manner. In some circumstances, the tire sensor device 200 is installed at the time of manufacture, although the tire sensor device 200 may also be installed at a later time. In some circumstances, the tire sensor device 200 is mounted at a midline of the inner surface of the tire, opposite the tread, although tire sensor device 200 may be installed elsewhere. In addition, two or more tire sensor devices 200 may be installed on a single tire. In some embodiments, the tire sensor device 200 is installed with a particular alignment relative to the tire (e.g., a first predetermined axis of the tire sensor device 200 is installed in a direction aligned with a circumference of the tire, such that the tire sensor device 200's accelerometers are aligned along a known axis with respect to the tire).

Figure 11A:
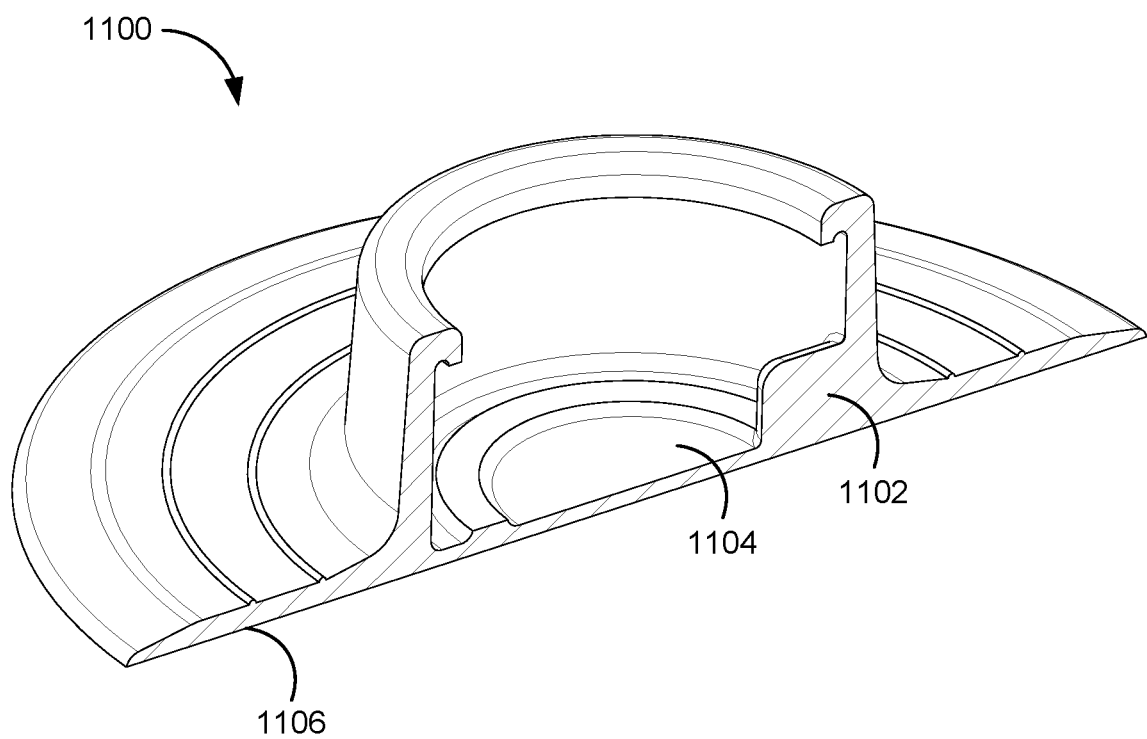
FIGS. 11A-11B show a tire sensor dock, in accordance with some embodiments.
Figure 11B:
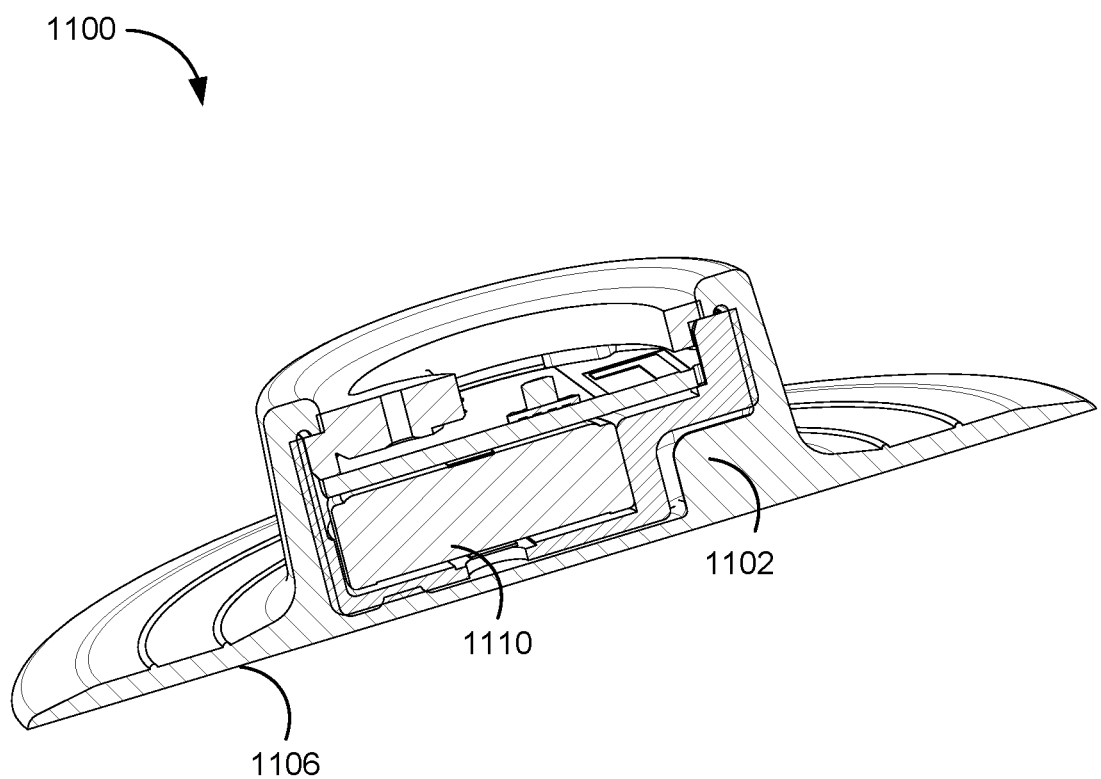

In some embodiments, the tire sensor device 200 is affixed to the inner surface of the tire through a tire sensor dock (e.g., tire sensor dock 1100, FIGS. 11A-11B).

FIG. 3 is a block diagram illustrating a tire monitoring system 300, in accordance with some embodiments. The tire monitoring system 300 includes one or more electronic devices 302 (e.g., electronic device 302-1 through electronic device 302-$m$, where m is an integer greater than one), one or more tire monitoring servers 304, and/or one or more tire sensor devices 200 (e.g., tire sensor device 200-1 through tire sensor device 200-$n$, where n is an integer greater than 1) affixed to tires on one or more vehicles 306.

One or more networks 314 communicably couple the components of the tire monitoring system 300. In some embodiments, the one or more networks 314 include public communication networks, private communication networks, or a combination of both public and private communication networks. For example, the one or more networks 314 can be any network (or combination of networks) such as the internet, other wide area networks (WAN), local area networks (LAN), virtual private networks (VPN), metropolitan area networks (MAN), peer-to-peer networks, and/or ad-hoc connections.

In some embodiments, an electronic device 302 is associated with one or more users (e.g., vehicle owners or fleet managers). In some embodiments, an electronic device 302 is a personal computer, mobile electronic device, wearable computing device, laptop computer, tablet computer, mobile phone, feature phone, smart phone, television (TV), digital versatile disk (DVD) player, dongle, and/or any other electronic device capable of communicating with a tire sensor device 200 and presenting information to a user. Electronic devices 302 may connect to each other wirelessly and/or through a wired connection (e.g., directly through an interface, such as an HDMI interface). In some embodiments, electronic devices 302-1 and 302-m are the same type of device (e.g., electronic device 302-1 and electronic device 302-m are smart phones). Alternatively, electronic device 302-1 and electronic device 302-m include two or more different types of devices (e.g., electronic device 302-1 is a portable multifunction device, such as a smart phone, and electronic device 302-m is a desktop computer or smart television).

In some embodiments, electronic device 302-1 communicates directly with one or more tire sensor devices 200 (as illustrated by the dotted line connecting tire sensor devices 200 and electronic device 302-1). For example, electronic device 302-1 is able to communicate directly (e.g., through a wired connection (e.g., analog input 114, FIG. 1) and/or through a short-range wireless signal (e.g., using antenna 110, FIG. 1), such as those associated with personal-area-network (e.g., BLUETOOTH/BLE) communication technologies, radio-frequency-based near-field communication technologies, infrared communication technologies, etc.) with a tire sensor device 200. In some embodiments, electronic device 302-1 communicates with the tire sensor device 200 through network(s) 314. In some embodiments, electronic device 302-1 uses the direct connection with tire sensor device 200 to receive data from the plurality of sensors on the tire sensor device 200. For example, electronic device 302-1 acts as a transceiver for data from the plurality of sensors on tire sensor device 200 and uploads the data to a tire monitoring server 304. Alternatively, the tire sensor device may communicate with an onboard diagnostic (OBD) dongle (e.g., an OBD-II data dongle) on a vehicle or a vehicle modem, which acts as a transceiver for data from the plurality of sensors on tire sensor device 200 and uploads the data to a tire monitoring server 304.

In some embodiments, the data are received by the one or more tire monitoring servers 304 for data processing and analytics. For example, the tire monitoring servers may be associated with AMAZON WEB SERVICES or GOOGLE CLOUD PLATFORM. The tire monitoring servers may be adapted with machine-learning models to identify the causes for tire life reduction. Such causes may include, but are not limited to, road surface conditions (e.g., potholes, icy conditions), temperature conditions, and driver behavior (e.g., aggressive driving, hard turning, rapid acceleration).

Figure 4A:
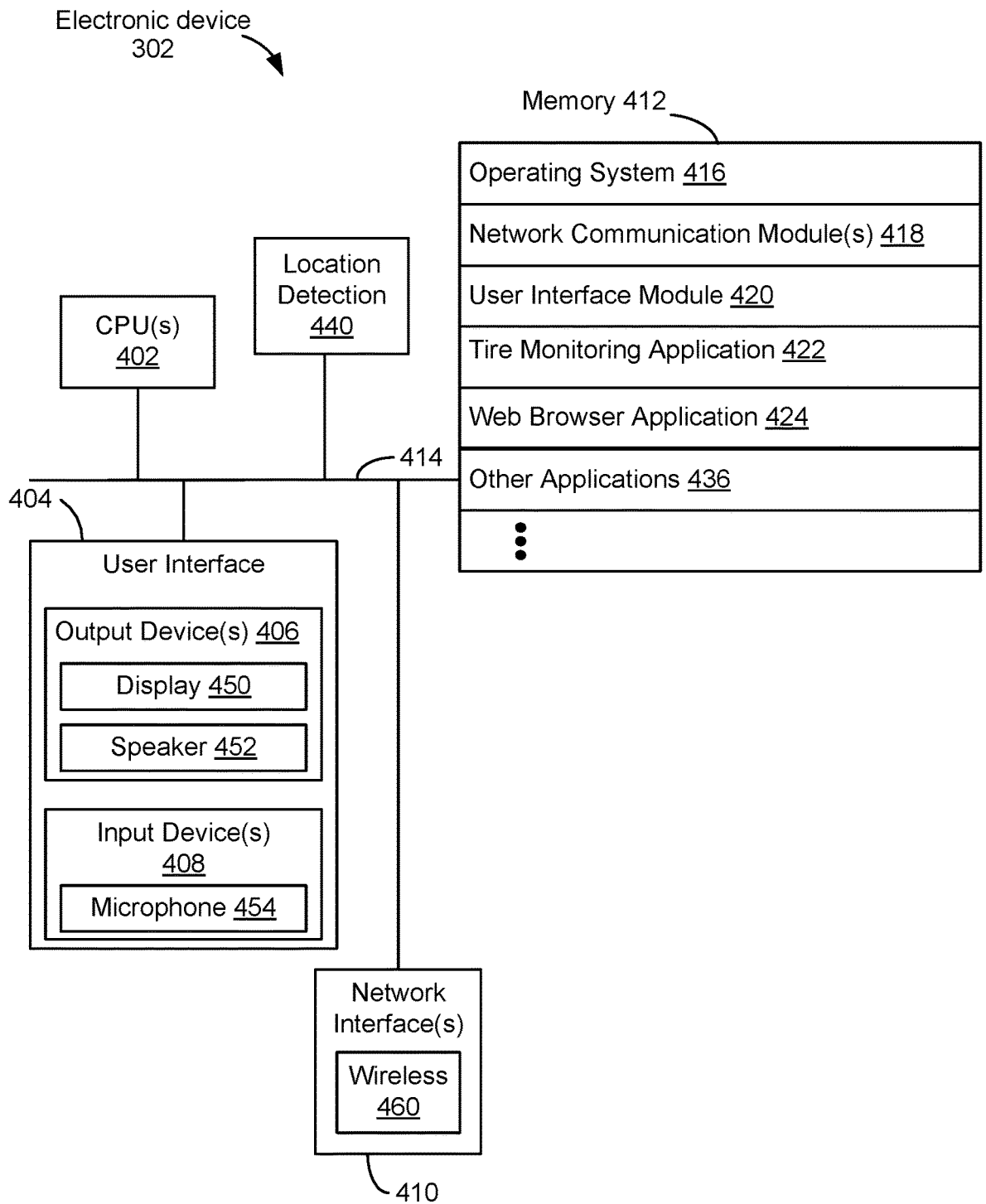
FIG. 4A is a block diagram illustrating a tire monitoring server, in accordance with some embodiments.

FIG. 4A is a block diagram illustrating an electronic device 302 (e.g., a computer system/client device, such as electronic device 302-1 and/or electronic device 302-m, FIG. 3), in accordance with some embodiments. The electronic device 302 includes one or more CPUs 402, one or more network (or other communications) interfaces 410, memory 412, and one or more communication buses 414 for interconnecting these components. The communication buses 414 optionally include circuitry (sometimes called a chipset) that interconnects and controls communications between system components.

In some embodiments, the electronic device 302 includes a user interface 404, including output device(s) 406 and/or input device(s) 408. In some embodiments, the input devices 408 include a keyboard, mouse, or track pad. In some embodiments, output devices 406 include a display device 450. In some embodiments, the display device 450 includes a touch-sensitive surface, in which case the display device 450 is a touch-sensitive display. In electronic devices that have a touch-sensitive display, a physical keyboard is optional (e.g., a soft keyboard may be displayed when keyboard entry is needed). In some embodiments, the output devices 406 include a speaker 452 (e.g., speakerphone device) and/or an audio jack. In some embodiments, the electronic device 302 includes an audio input device (e.g., a microphone 454) to capture audio (e.g., speech from a user).

In some embodiments, the electronic device 302 includes a location-detection device 440, such as a global navigation satellite system (GNSS) (e.g., GPS (global positioning system), GLONASS, Galileo, BeiDou) or other geo-location receiver, and/or location-detection software for determining the location of the electronic device 302 (e.g., module for finding a position of the electronic device 302 using trilateration of measured signal strengths for nearby devices).

In some embodiments, the one or more network interfaces 410 include wireless and/or wired interfaces for receiving data from and/or transmitting data to other electronic devices 302, a tire monitoring server 304, and/or other devices or systems. In some embodiments, data communications are carried out using any of a variety of custom or standard wireless protocols (e.g., NFC, RFID, IEEE 802.15.4, WI-FI, ZIGBEE, 6LOWPAN, THREAD, Z-WAVE, BLUETOOTH, ISA100.11A, WIRELESSHART, MIWI, etc.). Furthermore, in some embodiments, data communications are carried out using any of a variety of custom or standard wired protocols (e.g., USB, FIREWIRE, ETHERNET, etc.). For example, the one or more network interfaces 410 include a wireless interface 460 for enabling wireless data communications with other electronic devices 302, and/or or other wireless (e.g., BLUETOOTH-compatible) devices (e.g., tire sensor devices 200). Furthermore, in some embodiments, the wireless interface 460 (or a different communications interface of the one or more network interfaces 410) enables data communications with other WLAN-compatible devices (e.g., electronic device(s) 302) and/or the tire monitoring server 304 (via the one or more network(s) 314, FIG. 3).

In some embodiments, electronic device 302 includes one or more sensors including, but not limited to, accelerometers, gyroscopes, compasses, magnetometers, light sensors, near field communication transceivers, barometers, humidity sensors, temperature sensors, proximity sensors, range finders, and/or other sensors/devices for sensing and measuring various environmental conditions.

Memory 412 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices.

Memory 412 may optionally include one or more storage devices remotely located from the CPU(s) 402. Memory 412, or alternately, the non-volatile memory solid-state storage devices within memory 412, includes a non-transitory computer-readable storage medium. In some embodiments, memory 412 or the non-transitory computer-readable storage medium of memory 412 stores the following programs, modules, and data structures, or a subset or superset thereof:

- an operating system 416 that includes procedures for handling various basic system services and for performing hardware-dependent tasks;
- network communication module(s) 418 for connecting the electronic device 302 to other computing devices (e.g., other electronic device(s) 302, and/or tire monitoring server 304) via the one or more network interface(s) 410 (wired or wireless) connected to one or more network(s) 314;
- a user interface module 420 that receives commands and/or inputs from a user via the user interface 404 (e.g., from the input devices 408) and provides outputs for presentation and/or display on the user interface 404 (e.g., the output devices 406);
- a tire monitoring application 422 for receiving and displaying information from one or more vehicles indicating presence or absence of a plurality of tire conditions (e.g., as determined using data from one or more tire sensors 200 mounted within the vehicle's tires);
- a web browser application 424 (e.g., INTERNET EXPLORER or EDGE by MICROSOFT, FIREFOX by MOZILLA, SAFARI by APPLE, and/or CHROME by GOOGLE) for accessing, viewing, and/or interacting with web sites. In some embodiments, the web browser application 424 may be used to access and display a dashboard summary of the one or more tire conditions for the plurality of vehicles (e.g., provided by tire monitoring server 304, FIG. 3); and
- other applications 436, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Each of the above identified modules stored in memory 412 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 412 optionally store a subset or superset of the respective modules and data structures identified above. Furthermore, memory 412 optionally store additional modules and data structures not described above.

Figure 4B:
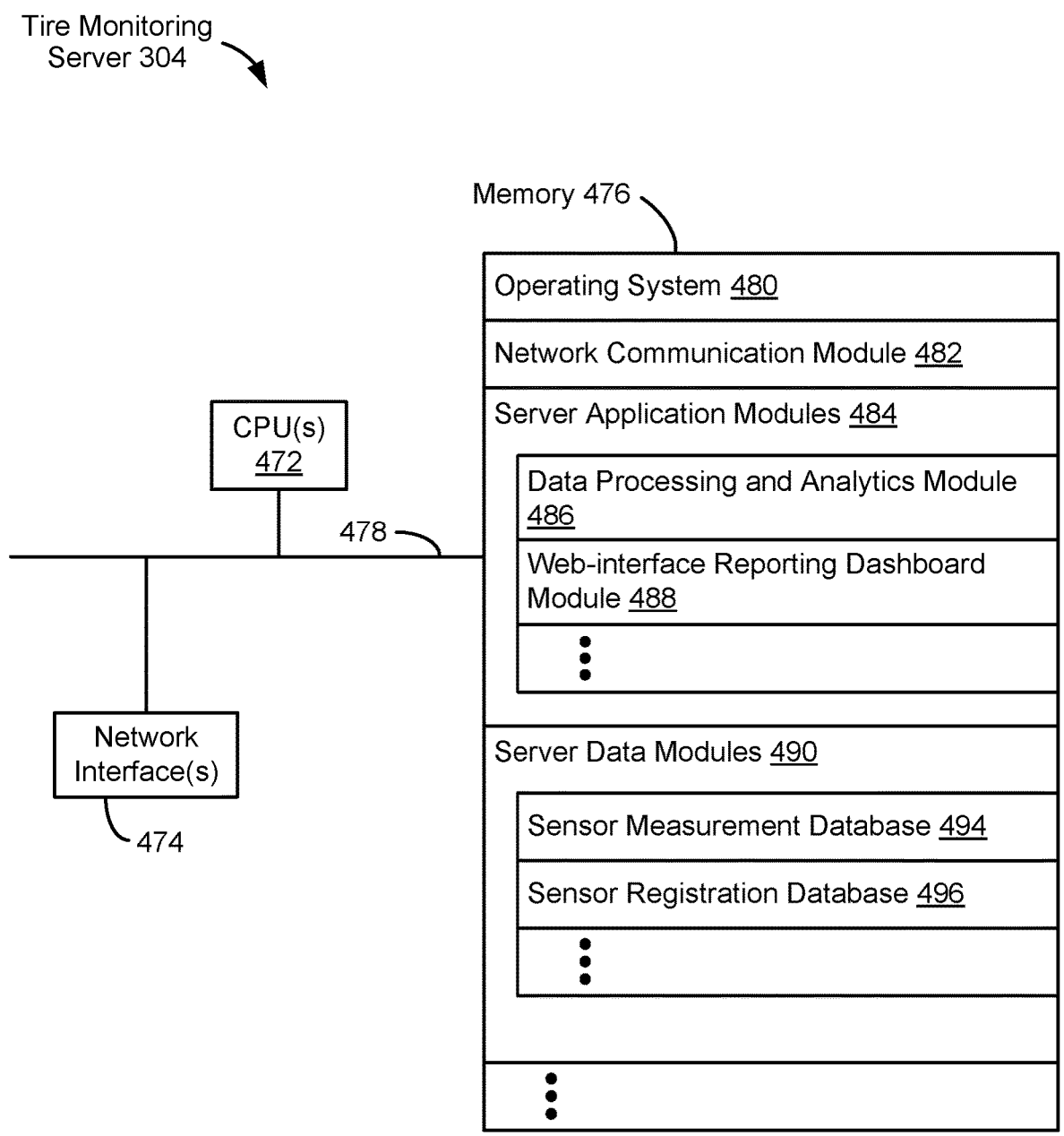
FIG. 4B is a block diagram illustrating a client device, in accordance with some embodiments.

FIG. 4B is a block diagram illustrating a tire monitoring server 304 (e.g., a computer system), in accordance with some embodiments. The tire monitoring server 304 typically includes one or more central processing units (CPUs) 472, one or more network interfaces 474, memory 476, and one or more communication buses 478 for interconnecting these components.

Memory 476 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 476 optionally includes one or more storage devices remotely located from one or more CPUs 472. Memory 476, or, alternatively, the non-volatile solid-state memory device(s) within memory 476, includes a non-transitory computer-readable storage medium. In some embodiments, memory 476, or the non-transitory computer-readable storage medium of memory 476, stores the following programs, modules and data structures, or a subset or superset thereof:

- an operating system 480 that includes procedures for handling various basic system services and for performing hardware-dependent tasks;
- a network communication module 482 that is used for connecting the tire monitoring server 304 to other computing devices via one or more network interfaces 474 (wired or wireless) connected to one or more networks 314;
- one or more server application modules 484 for performing various functions with respect to monitoring tire conditions, the server application modules 484 including, but not limited to, one or more of:
  - data processing and analytics module 486 that receives data from one or more sensors (e.g., accelerometers, temperature sensors, microphones, or any of the other sensors described herein) on tire sensor devices (e.g., tire sensor devices 200, FIG. 2) and determines one or more characteristics of tires (e.g., rubber decay, low tread depth, excessive load, or any of the other characteristics described herein) using the data from the sensors. In some embodiments, the determination of the one or more characteristics of the tires is made in real-time (e.g., as the data is received) without user intervention (e.g., a client device need not request the determination); and
  - web-interface reporting dashboard module 488 (e.g., executed as an application program interface (API)) for transmitting, for display (e.g., on a client device, such as electronic device 302-1 or 302-$m$), a dashboard summary of the one or more tire conditions for the plurality of vehicles and/or for providing a user alert indicating the one or more characteristics of the tire. In some embodiments, the dashboard summary provides a user with information from tire sensor devices registered to the user (e.g., in sensor registration database 496).
- one or more server data module(s) 490 for handling the storage of and/or access to data (e.g., measurements) from tire sensors (e.g., tire sensor devices 200, FIG. 2) and registration of tire sensors; in some embodiments, the one or more server data module(s) 490 include:
  - sensor measurement database 494 for storing raw data (e.g., measurements) from one or more sensors (e.g., accelerometers, temperature sensors, microphones, or any of the other sensors described herein) on a tire sensor device (e.g., tire sensor device 200, FIG. 2) and/or partially processed data from said one or more sensors (e.g., where the tire sensor device performed one or more initial processing operations on the data to produce the partially processed data);
  - sensor registration database 496 for storing registration information for a plurality of users, a plurality of tire sensor devices, and a plurality of tires on which the plurality of tire sensor devices are mounted. For example, sensor registration database 496 stores a data structure (e.g., a table) that includes, for each user of a plurality of users: one or more tire sensor devices, identified using a unique device identifier, registered by the user (and thus associated with the user's account) and information about the tire on which each tire sensor device of the one or more tire sensor devices corresponding to the user is mounted. In some embodiments, the tire information includes a make, model, and/or year of the tire. In some embodiments, the tire information includes one or more characteristics determined by data processing and analytics module 486 (e.g., a mileage on the tire, a projected lifetime of the tire). In some embodiments, the tire information includes one or more characteristics input during registrations. For example, in some embodiments, the tire information includes one or more characteristics input by the user and/or one or more characteristics obtained using image analysis of a photograph of the tire (e.g., using text recognition to read the model, make, age, serial number, and/or size of the tire off of tire codes imprinted on the tire's sidewall).

In some embodiments, the tire monitoring server 304 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 476 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 476 optionally store a subset or superset of the respective modules and data structures identified above. Furthermore, memory 476 optionally store additional modules and data structures not described above.

Although FIG. 4B illustrates the tire monitoring server 304 in accordance with some embodiments, FIG. 4B is intended more as a functional description of the various features that may be present in one or more tire monitoring servers than as a structural schematic of the embodiments described herein. In practice, and as recognized by those of ordinary skill in the art, items shown separately could be combined and some items could be separated. For example, some items shown separately in FIG. 4B could be implemented on single servers and single items could be implemented by one or more servers. In some embodiments, server data modules 490 are stored on devices (e.g., other servers) that are accessed by server application modules 484. The actual number of servers used to implement the tire monitoring server 304, and how features are allocated among them, will vary from one implementation to another and, optionally, depends in part on the amount of data traffic that the server system handles during peak usage periods as well as during average usage periods.

Figure 5C:
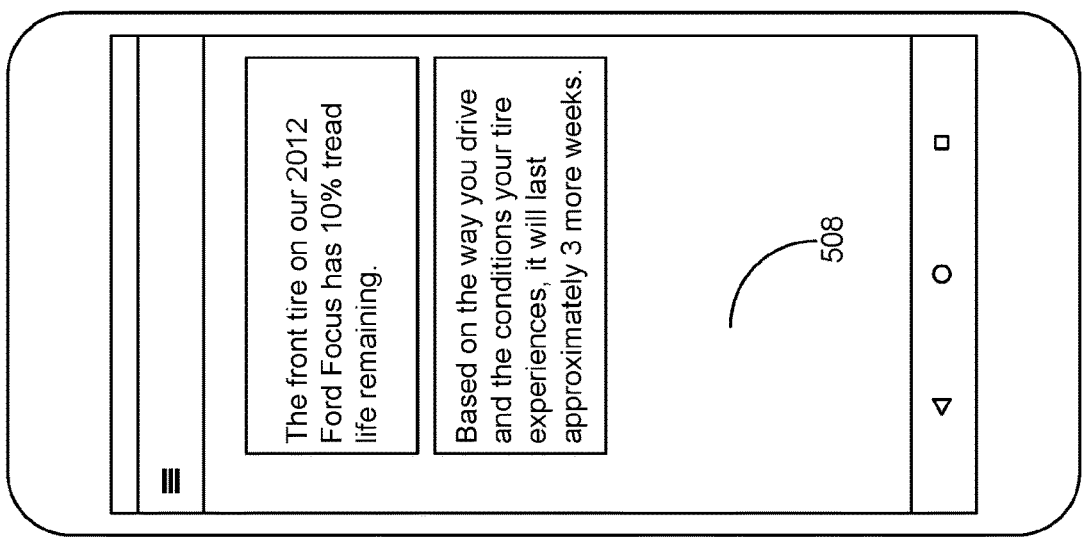
FIGS. 5A-5C illustrate example user interfaces for providing information (e.g., user alerts) about tire characteristics and/or tire conditions for one or more vehicles, in accordance with some embodiments.
Figure 5B:
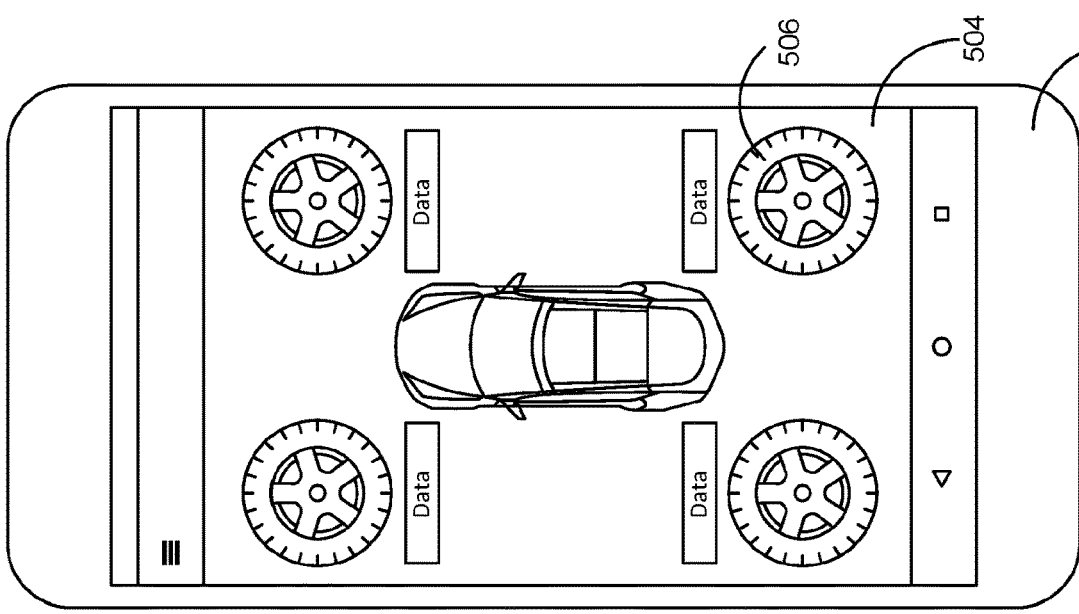
Figure 5A:
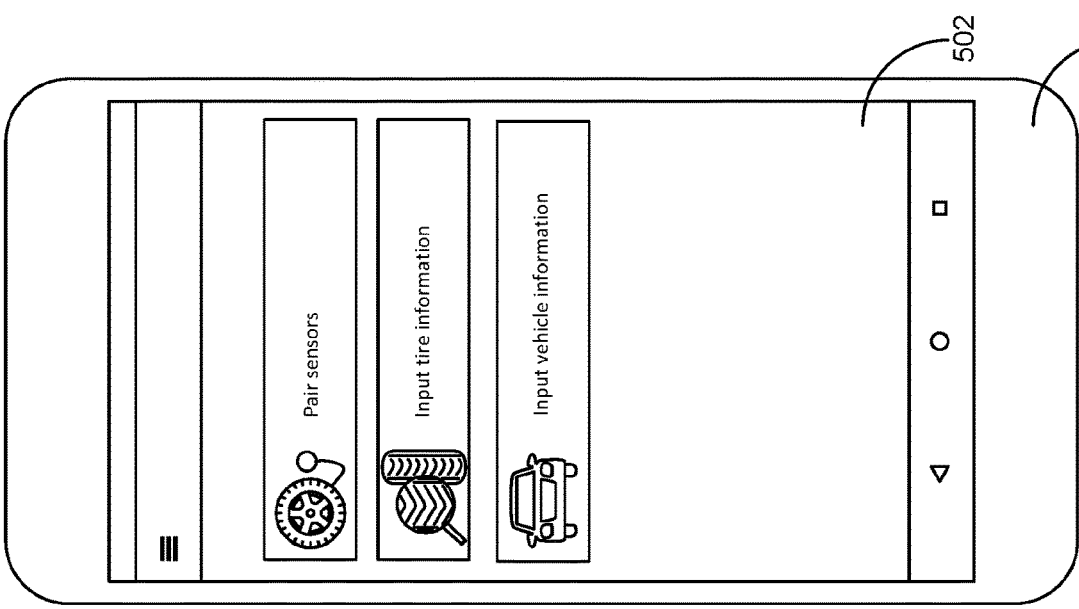

FIGS. 5A-5C illustrate example user interfaces for providing information (e.g., user alerts) about tire characteristics and/or tire conditions for one or more vehicles, in accordance with some embodiments. In some embodiments, the user interfaces shown in FIGS. 5A-5C are displayed on a client device (e.g., a client, such as electronic device 302-1, of tire monitoring server 304, FIG. 3).

FIG. 5A illustrates a user interface 502 for registering a tire sensor device with a user's account. To that end, user interface 502 includes an affordance for pairing sensors (e.g., through BLUETOOTH, NFC, or some other communications protocol), an affordance for inputting tire information in correspondence with the paired sensor (e.g., a make, model, year, and/or manufacture date of the tire on which the paired tire sensor device is mounted), and an affordance for inputting vehicle information in correspondence with the paired sensor (e.g., a make, model, and/or year of the vehicle on which the paired tire sensor device is mounted). In some embodiments, a user can register (e.g., associate) tire sensor devices on a plurality of vehicles with the same account, and thus user interface 502 can be used to register tire sensor devices for a fleet of vehicles.

In some embodiments, tire information is input by taking a picture of a tire. For example, a user may take a picture of a tire and one or more characteristics (e.g., make, model, size, year of manufacture, serial number, and/or size of the tire) may be determined using image analysis. For example, the one or more characteristics may be read off of the tire (automatically, without user intervention) using text recognition (e.g., using text recognition to read the model, make, age, serial number, and/or size of the tire off of tire codes imprinted on the tire's sidewall). Note that a user may be asked to confirm the values for the one or more characteristics after the values for the one or more characteristics have been obtained using an image.

FIG. 5B illustrates a user interface 504 for providing information and user alerts indicating characteristics of tires on a vehicle, as determined from tire sensor devices in each tire on the vehicle. In some embodiments, the user interface 504 indicates required service on a per tire basis for a respective vehicle. For example, user interface 504 may provide, for each tire on the vehicle (e.g., for each tire in which a tire sensor device is mounted), a user alert in response to determining a wheel misalignment; a slow leak; a puncture; rubber decay; low tread depth; excessive load; and a mileage limit exceeded. In addition, user interface 504 may provide, for each tire on the vehicle (e.g., for each tire in which a tire sensor device is mounted), information (e.g., data) such as the tire's pressure, remaining life (e.g., a projected remaining lifetime based on the driver's driving habits and the conditions experienced by the tire (e.g., road conditions, temperature conditions, etc.), as determined by the tire sensor device mounted on the tire). In some embodiments, user interface 504 includes, for a respective vehicle, a plurality of visual representations 506 of tires (e.g., a visual representation 506 of a tire for each tire in which a tire sensor device is mounted). In some embodiments, visual representations 506 of tires having a corresponding alert condition are visually distinguished from representations of tires that do not have an alert condition. In some embodiments, a visual representation 506 of a respective tire having a corresponding alert condition is visually distinguished from visual representations 506 of tires that do not have an alert condition by color coding (e.g., tires shown in red have an alert indicating an issue that requires attention, such as a slow leak or a mileage limit exceeded, whereas tires shown in green do not have an alert condition).

FIG. 5C illustrates another user interface 508 for providing information and user alerts indicating characteristics of tires on a vehicle. In some embodiments, when updated information is received (e.g., by tire monitoring server 304) from the vehicle (e.g., from a tire sensor device 200 on the vehicle) indicating that an alert condition for tire on the vehicle is met, an alert is automatically provided indicating that the tire on the respective vehicle requires service (e.g., a text message is provided as shown in FIG. 5C). For example, a text message is provided to the user (e.g., in real-time, without the user's intervention), when a change in characteristics of a tire prompt an alert. As a more specific example, when tire monitoring server 304 determines that a tire has a predefined amount of tread life remaining (e.g., 25%, 10%, 0%), the tire monitoring server 304 sends a text message to the user informing the user of the remaining tread life. In some embodiments, analogous user alerts are provided based on other tire conditions, characteristics, and/or changes in characteristics discussed herein (e.g., detection of a slow leak or a puncture, excessive load, wheel misalignment, etc.).

Figure 6:
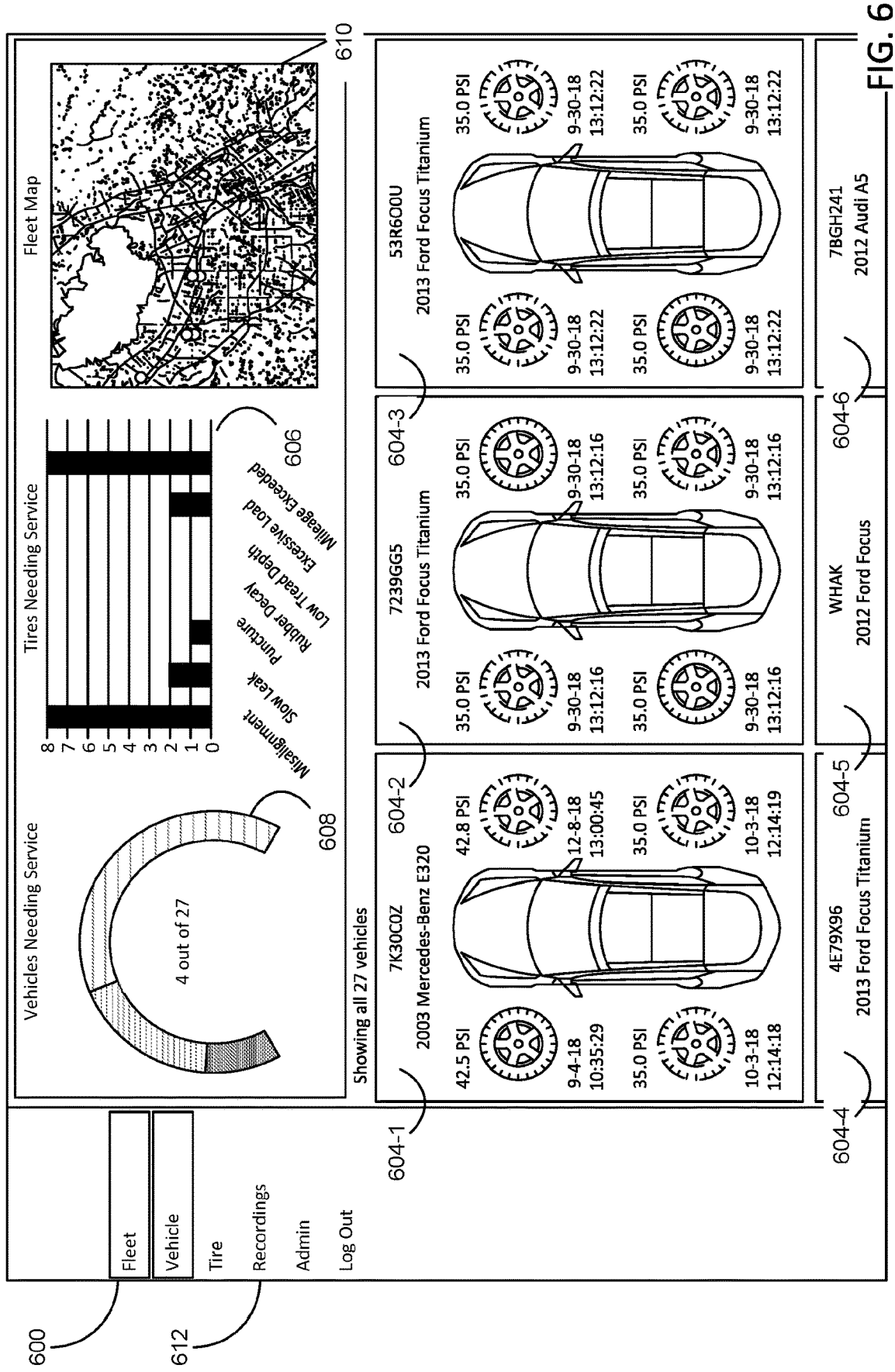
FIG. 6 illustrates an example of a user interface that includes a dashboard summary of tire characteristics and/or tire conditions for a plurality of vehicles (e.g., a fleet of vehicles), in accordance with some embodiments.

FIG. 6 illustrates an example of a user interface 600 that includes a dashboard summary of tire characteristics and/or tire conditions for a plurality of vehicles (e.g., a fleet of vehicles), in accordance with some embodiments. In some embodiments, user interface 600 is displayed on a client device (e.g., a client, such as electronic device 302-*m*, of tire monitoring server 304, FIG. 3).

In some embodiments, user interface 600 includes a plurality of representations 604 of vehicles (e.g., representations 604-1 through 604-6). Each representation 604 of a vehicle corresponds to a vehicle that is registered to the same user. The representations 604 of vehicles may include analogous information as the user interface 504 (FIG. 5B). For example, in some embodiments, representations 604 indicate required service on a per tire basis for each respective vehicle of a plurality of vehicles registered to the user. The representations 604 of vehicles may provide color coded representations of tires, where the color of the tire indicates a user alert condition (e.g., a slow leak, wheel misalignment, etc.) For brevity, the details described above are not repeated here. In some embodiments, user interface 600 includes a representation 604 of each vehicle in a fleet of vehicles.

In some embodiments, user interface 600 further includes an indication 606 of a number of tires (e.g., registered to the user) requiring service for each of one or more tire conditions (e.g., wheel misalignment, slow leak, puncture, rubber decay, low tread depth, excessive load, and/or mileage exceeded) as determined by tire sensor devices mounted on the tires. In some embodiments, user interface 600 further includes an indication 608 of a number of vehicles (e.g., registered to the user) requiring service (e.g., the vehicles' tires require service, as determined by tire sensor devices mounted on the tires).

In some embodiments, user interface 600 provides a fleet map 610 showing geographical locations of vehicles in the plurality of vehicles that are represented by representations 604.

In some embodiments, user interface 600 is updated automatically, without user intervention, as updated data is received from a respective vehicle of the plurality of vehicles. For example, when the updated information indicates that a tire on the respective vehicle requires service (e.g., in accordance with a determination that an alert condition for a tire is met), user interface 600 provides an alert indicating that the tire on the respective vehicle requires service.

In some embodiments, although not shown in detail, user interface 600 provides playback (e.g., replay) of data from tire sensor devices (e.g., through recordings affordance 612). For example, a user can select any date and time in the recorded history of any tire in the fleet of vehicles and view pressure, temperature, and/or speed changes over a predefined time window (e.g., 15 minutes, 30 minutes, an hour, etc.). Thus, user interface 600 helps the user understand specific events in a tire's history (e.g., where a tire hit a nail on the road).

Figure 7C:
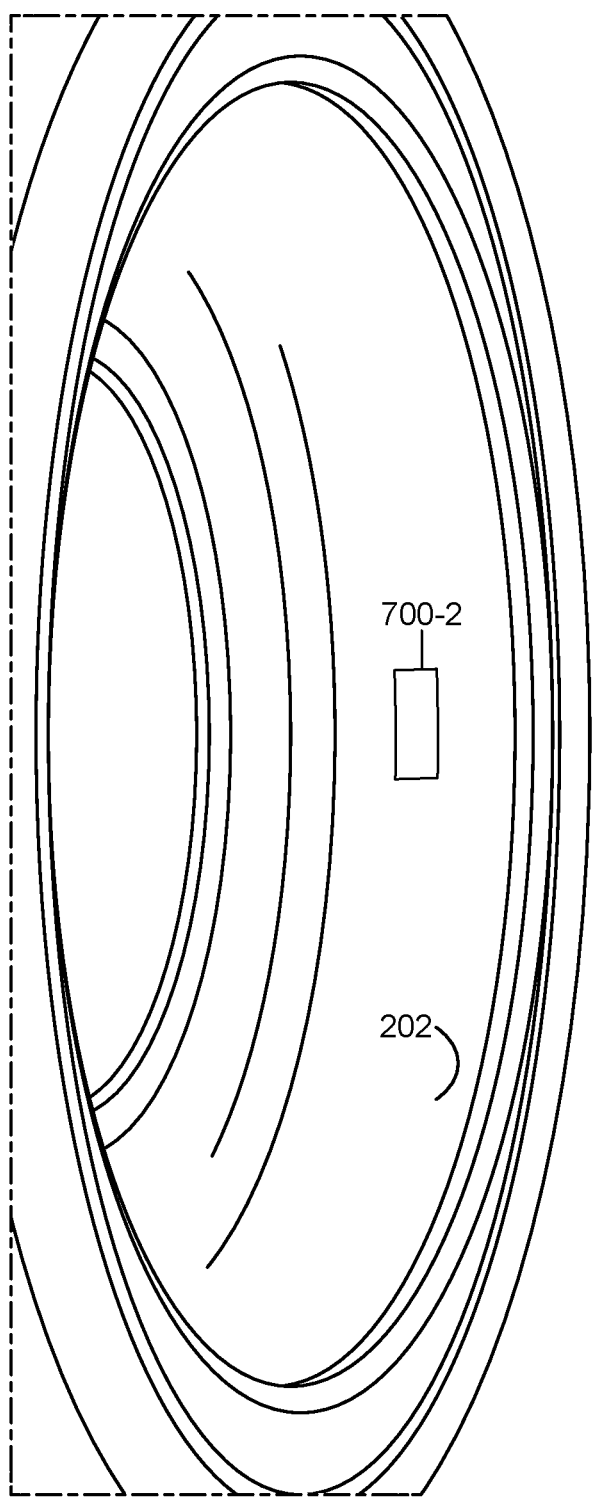

FIGS. 7A-7C are schematic diagrams of antennas 700 for use in a tire sensor device, in accordance with some embodiments. In particular, FIG. 7A illustrates an example implementation of a rigid antenna 700-1 disposed on a PCB board with a SubMiniature version A (SMA) connector 708. FIG. 7B illustrates an example implementation of a flexible antenna 700-2 with a connection pad 710. The flexible antenna 700-2 may be adhered to the inner surface of a tire and, by virtue of its flexibility, contour to the inner surface of the tire, as shown in FIG. 7C. In some embodiments, flexible antenna 700-2 may be integrated or embedded in a tire sensor dock, as described with reference to FIGS. 11A-11B.

Alternatively, an antenna may be printed or otherwise provided on the same circuit board as a plurality of sensors, as shown and described with reference to sensor board 100, FIG. 1.

In some embodiments, antennas 700 are multi-mode antennas (e.g., comprise a single antenna structure that simultaneously transmits and receives data over a plurality of bands). In some embodiments, the plurality of bands include a 2.4 GHz band (e.g., for BLUETOOTH), 900 MHz GSM band, and a 415 MHz ISM band. FIG. 7A shows an example implementation of the triple mode antenna 700-1 showing the antenna elements 704 covering the 2.4 GHz, 900 MHz and 415 MHz bands (e.g., the 2.4 GHz band is covered by a combination of element 704-1, element 704-2, and element 704-3; the 900 MHz band is covered by a combination of element 704-1 and 704-2; and the 415 MHz band is covered by element 704-1). The antenna 700-1 includes inductance traces 706 (e.g., an inductance trace 706-1 having an inductance value L1 and an inductance trace 706-2 having an inductance value L2). In some embodiments, the values of the inductances L1 and L2 are adjusted to tune the transmission and reception of signals.

Figure 8:
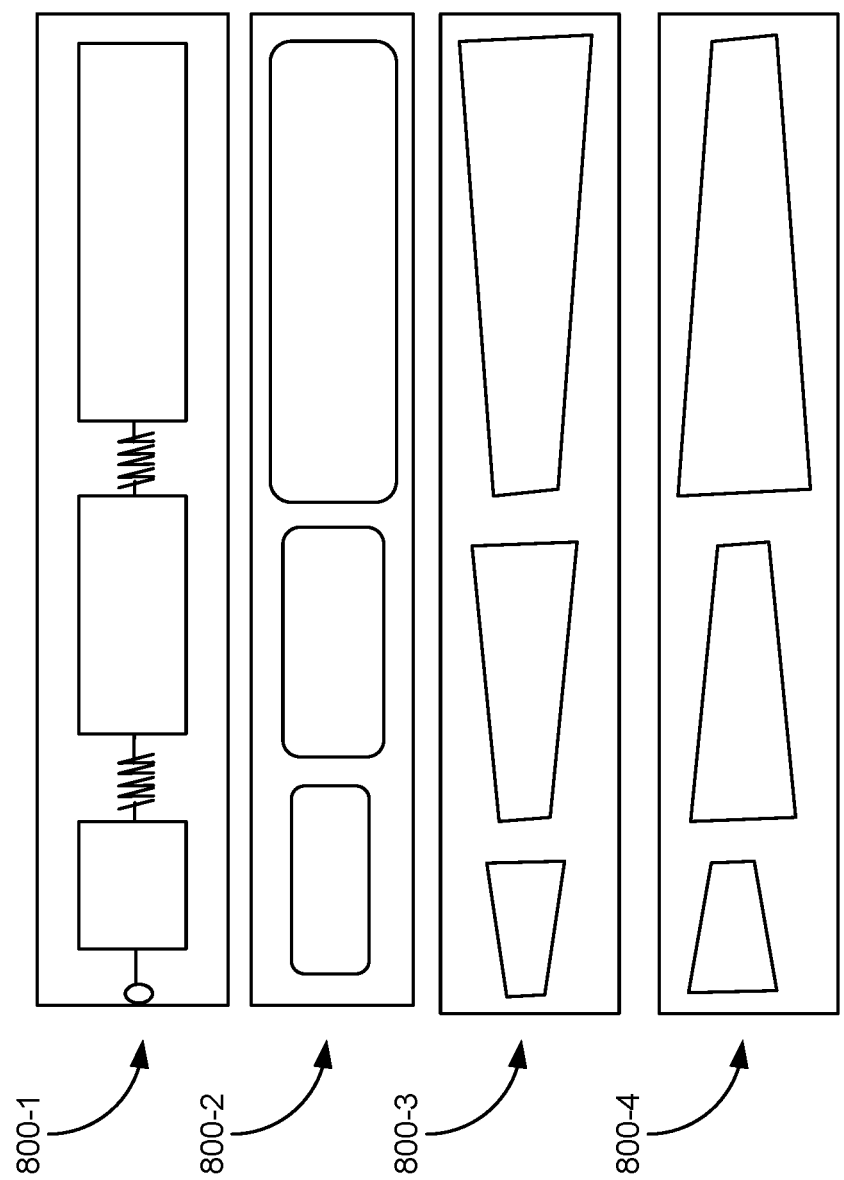
FIG. 8 illustrates schematic diagrams of additional embodiments of antennas for use in a tire sensor device, in accordance with some embodiments.

FIG. 8 illustrates schematic diagrams of additional embodiments of antennas 800 (e.g., antenna 800-1 through antenna 800-4) for use in a tire sensor device, in accordance with some embodiments. In particular, FIG. 8 illustrates various shapes of antenna elements. In accordance with some embodiments, the shapes and sizes of the antenna elements can be adjusted, enhanced, or modified to improve performance in the frequencies (e.g., bands) of interest. Note that some elements, such as the inductance traces and connectors, have been omitted from the drawings of various antennas 800.

FIG. 9 is a flow diagram of a method 900 for providing a user alert indicating one or more characteristics of a tire, in accordance with some embodiments. In some embodiments, various operations of method 900 are performed by a tire sensor device (e.g., tire sensor device 200, FIG. 2). In some embodiments, various operations of method 900 are performed by a tire monitoring server (e.g., tire monitoring server 304, FIG. 3) that receives data from a tire sensor device. In some embodiments, various operations of method 900 are performed by an electronic device (e.g., electronic device 302-1 and/or electronic device 302-2, FIG. 3) communicatively-coupled with a tire sensor device and/or communicatively-coupled with a tire monitoring server.

Method 900 provides an improved process for detecting and reporting tire degradation in one or more vehicles. In some embodiments, method 900 uses an unconventional combination of measurement apparatuses (e.g., sensors) disposed within a tire to improve safety, performance, and efficiency (e.g., fuel and/or energy economy) of vehicles by improving tire maintenance.

The method 900 includes receiving (902) data from a plurality of sensors disposed within a tire. The plurality of sensors include a microphone, a temperature sensor, and an accelerometer. The data from the plurality of sensors are acquired at a frequency greater than a frequency of rotation of the tire (e.g., at a predefined speed and for a predefined tire size and/or circumference). For example, the data from the plurality of sensors are acquired at a frequency greater than the frequency of rotation of the tire when the vehicle is moving less than a maximum speed of 120 mph (e.g., accounting for the tires size and/or circumference). In some embodiments, data from the plurality of sensors are acquired at a frequency greater than twice the frequency of rotation of the tire. In some embodiments, data from the plurality of sensors are acquired at a frequency greater than a Nyquist frequency based on relevant features in the data when the tire is rotating at a predefined speed. In some embodiments, data from the plurality of sensors are acquired at a frequency of at least 3000 Hz, 4000 Hz, or 5000 Hz.

The method 900 further includes determining (904) one or more characteristics of the tire using the data from the plurality of sensors acquired at the frequency greater than the frequency of rotation of the tire. The one or more characteristics of the tire are selected from the group consisting of: a wheel misalignment; a slow leak; a puncture; rubber decay; low tread depth; excessive load; and a mileage limit exceeded.

In some embodiments, the determination of the one or more characteristics of the tire using the data from the plurality of sensors acquired at the frequency greater than the frequency of rotation of the tire is based on one or more features of a power spectral density of data from the plurality of sensors, wherein the one or more features have characteristic frequencies greater than the frequency of rotation of the tire (e.g., the method includes analyzing a power spectral density of the data from the plurality of sensors at the frequency greater than the frequency of rotation of the tire).

Further, in some embodiments, high-frequency vibrations in a tire (e.g., vibrations at a frequency greater than the frequency of rotation of the tire) can be sensed by the microphone and/or the accelerometer. These vibrations can be used to understand the road surface, and/or the friction between the tire and the road surface. Thus, in some embodiments, determining the one or more characteristics of the tire using the data from the plurality of sensors acquired at the frequency greater than the frequency of rotation of the tire includes accounting for (e.g., correcting for) one or more driving conditions, such as a road surface and/or ambient temperature.

In some embodiments, determining that the rubber on the tire has decayed includes detecting anomalies and/or trends in the motion and vibration of the tire (e.g., by detecting trends in vibration signals, as measured by the accelerometer and/or microphone). For example, determining that the rubber on the tire has decayed includes detecting an emergent peak in the power spectral density of the accelerometer and/or microphone data and determining that the emergent peak is not due to driving conditions.

In some embodiments, determining that the tire is mounted to a misaligned wheel includes analyzing motion (e.g., wobble) of the tire as determined by data from the accelerometer and other sensors (e.g., the microphone). For example, the accelerometer is a three-axis accelerometer and determining that the tire is mounted to a misaligned wheel includes detecting that data from the accelerometer include periodic motion of the tire along an axis of rotation of the tire (e.g., at the frequency of rotation of the tire).

In some embodiments, the plurality of sensors includes a pressure sensor and determining that the tire has a slow leak includes detecting that the data from the pressure sensor has decreased below a predefined rate (e.g., has decreased slowly). In some embodiments, determining that the tire has a slow leak includes determining that the decrease in pressure is not due to changes in ambient temperature.

In some embodiments, the plurality of sensors includes a pressure sensor and determining that the tire has a puncture includes detecting that the data from the pressure sensor has decreased above a predefined rate (e.g., has decreased quickly).

In some embodiments, determining that the tire has an excessive load includes correlating two or more of pressure, vehicle speed, and footprint length. In some embodiments, determining that the tire has an excessive load includes comparing footprint lengths between tires.

In some embodiments, determining that a mileage limit of the tire is exceeded includes counting a number of rotations (e.g., revolutions) of the tire to determine a total mileage of the tire. In some embodiments, the total mileage of the tire is compared to a specification mileage limit for the tire to determine that the mileage limit is exceeded.

In some embodiments, method 900 further includes determining a duration of a rotation of the tire (e.g., by determining a length of time of a single revolution of the tire from the accelerometer and/or microphone data and/or the power spectral density of the accelerometer and/or microphone data). In some embodiments, method 900 further includes determining a length of a footprint of the tire (e.g., by multiplying the duration of the rotation of the tire by a known circumference of the tire).

In some embodiments, method 900 includes mounting a tire sensor device on the tire. The tire sensor device includes the plurality of sensors. The tire sensor device further includes memory configured to store data received by the plurality of sensors and one or more processors coupled with the memory. The one or more processors are configured to perform one or more initial processing operations on the data received by the plurality of sensors; and an antenna, coupled with the one or more processors, configured to wirelessly communicate with one or more external devices. The information from the plurality of sensors is received from the tire sensor device.

The method 900 further includes providing (906) a user alert indicating the one or more characteristics of the tire (e.g., through the dashboard summary of user interface 600, FIG. 6, or as a text message as shown in FIG. 5C).

Although FIG. 9 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof. Further, method 900 may include any of the operations described elsewhere in this document (e.g., with respect to method 1000, FIG. 10).

Figure 10:
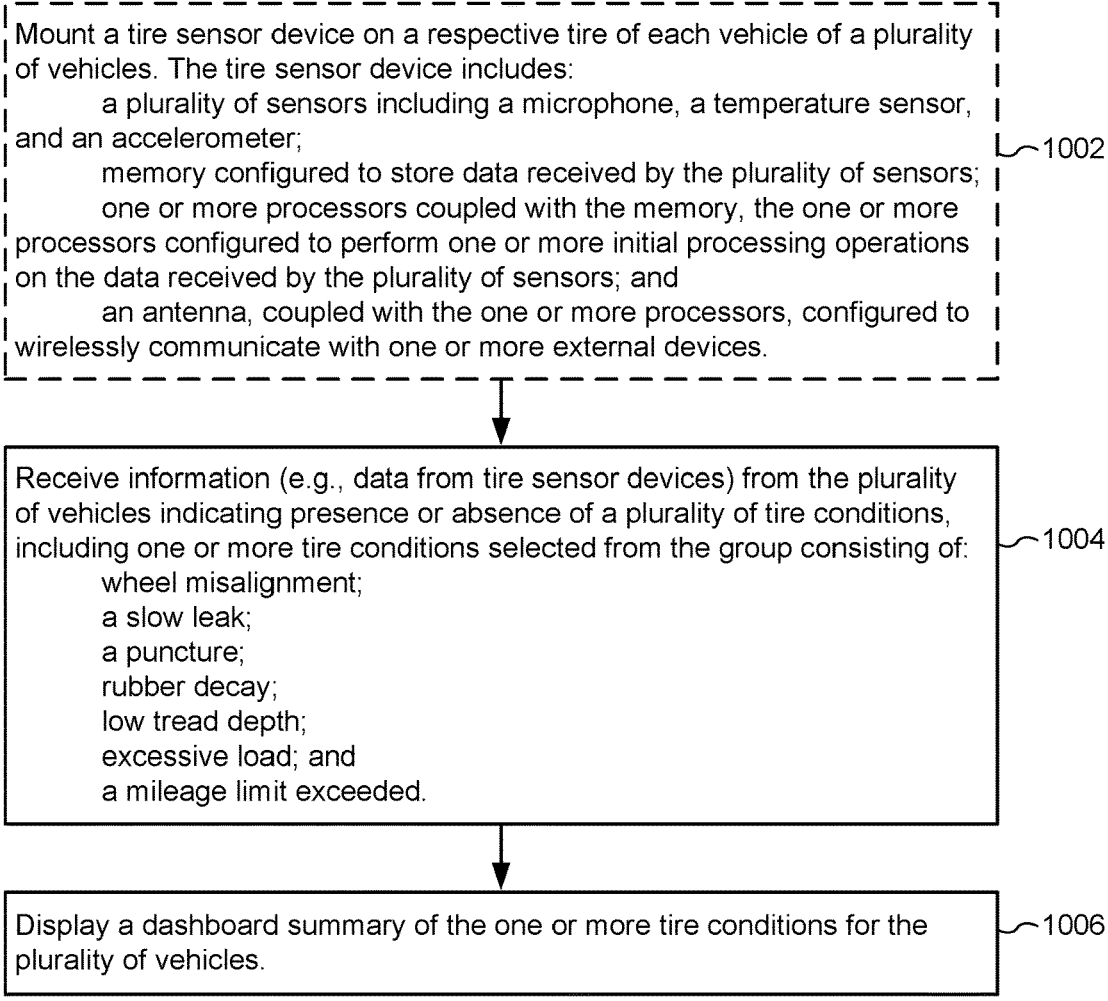
FIG. 10 is a flow diagram of a method for providing a dashboard summary of one or more tire conditions for a plurality of vehicles, in accordance with some embodiments.

FIG. 10 is a flow diagram of a method 1000 for providing a dashboard summary of one or more tire conditions for a plurality of vehicles, in accordance with some embodiments. In some embodiments, various operations of method 1000 are performed by a tire sensor device (e.g., tire sensor device 200, FIG. 2). In some embodiments, various operations of method 1000 are performed by a tire monitoring server (e.g., tire monitoring server 304, FIG. 3) that receives data from a tire sensor device. In some embodiments, various operations of method 1000 are performed by an electronic device (e.g., electronic device 302-1 and/or electronic device 302-2, FIG. 3) communicatively-coupled with a tire sensor device and/or communicatively-coupled with a tire monitoring server.

Method 1000 provides an improved process for detecting and reporting tire degradation in one or more vehicles (e.g., a fleet of vehicles). In some embodiments, method 1000 uses an unconventional combination of measurement apparatuses (e.g., sensors) disposed within a tire to improve safety, performance, and efficiency (e.g., fuel and/or energy economy) of vehicles by improving tire maintenance.

In some embodiments, method 1000 include mounting (1002) a tire sensor device (e.g., tire sensor device 200) on a respective tire of each vehicle of a plurality of vehicles. The tire sensor device includes: a plurality of sensors including a microphone, a temperature sensor, and an accelerometer; and memory configured to store data received by the plurality of sensors. The one or more processors are coupled with the memory and configured to perform one or more initial processing operations on the data received by the plurality of sensors. The tire sensor device optionally includes an antenna, coupled with the one or more processors, configured to wirelessly communicate with one or more external devices.

Method 1000 further includes receiving (1004) information (e.g., data from tire sensor devices) from the plurality of vehicles indicating presence or absence of a plurality of tire conditions, including one or more tire conditions selected from the group consisting of: wheel misalignment; a slow leak; a puncture; rubber decay; low tread depth; excessive load; and a mileage limit exceeded. In some embodiments, the information indicating the presence or absence of a plurality of tire conditions is received from a plurality of sensors disposed within a respective tire from the plurality of vehicles, the plurality of sensors including a microphone, a temperature sensor, and an accelerometer. Various embodiments for determining and/or detecting the presence or absence of such tire conditions are described above with reference to method 900, FIG. 9. For brevity, those details are not repeated here.

In some embodiments, method 1000 further includes displaying (1006) a dashboard summary of the one or more tire conditions for the plurality of vehicles (e.g., the dashboard summary of user interface 600, FIG. 6). In some embodiments, method 1000 includes enabling display of a dashboard summary of the one or more tire conditions for the plurality of vehicles (e.g., transmitting the dashboard summary, via and API, to a client device to be displayed in a web browser).

In some embodiments, the dashboard summary indicates a number of tires requiring service for each of the one or more tire conditions (e.g., as described with reference to indication 608, FIG. 6).

In some embodiments, the dashboard summary indicates required service on a per tire basis for a respective vehicle of the plurality of vehicles (e.g., as described with reference to representations 604, FIG. 6). In some embodiments, the dashboard summary includes visual representations of each tire of the respective vehicle. The visual representation of a respective tire indicates whether the respective tire requires service. In some embodiments, a color of the visual representation of the respective tire indicates whether the respective tire requires service.

In some embodiments, method 1000 further includes receiving updated information from a respective vehicle of the plurality of vehicles indicating that a tire on the respective vehicle requires service and providing an alert indicating that the tire on the respective vehicle requires service (e.g., by updating a visual appearance of the visual representation of a respective tire and/or by providing a text alert such as that shown in FIG. 5C).

In some embodiments, method 1000 includes, prior to operation 1002, receiving registration information from a plurality of tire sensor devices mounted on tires in the plurality of vehicles (e.g., as described with reference to FIG. 5A). In some embodiments, method 1000 includes associating the plurality of tire sensor devices with the tires on the plurality of vehicles. In some embodiments, method 1000 includes associating the plurality of tire sensor devices with a user's account (e.g., in a table, e.g., sensor registration database 496, FIG. 4B). In some embodiments, the dashboard summary is a dashboard summary for the user's account. In some embodiments, receiving registration information from a tire sensor device includes receiving an image of the tire on which the tire sensor device is mounted and performing image analysis to determine one or more characteristics of the tire (e.g., using text recognition to read the model, make, age, serial number, and/or size of the tire off of tire codes imprinted on the tire's sidewall).

Although FIG. 10 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof. Further, method 1000 may include any of the operations described elsewhere in this document (e.g., with respect to method 900, FIG. 9).

FIGS. 11A-11B shows a tire sensor dock 1100, in accordance with some embodiments. In some embodiments, tire sensor dock 1100 is adapted to receive a tire sensor device 1110 (FIG. 11B) (e.g., which may be functionally analogous to tire sensor device 200, FIG. 2). For example, tire sensor dock 1100 includes an opening 1104 that provides a snug fit with the tire sensor device 1110. In some embodiments, tire sensor dock 1100 is adapted to receive (e.g., mate with) a tire sensor device 1110 such that the tire sensor device 1110 is non-rotatably positioned within the sensor dock. For example, tire sensor dock 1100 includes or has formed therein a boss 1102 which abuts the tire sensor device 1110 and prevents rotation (e.g., the tire sensor device 1110 has formed therein a complementary feature that receives the boss 1102 and prevents rotation). Alternatively, tire sensor dock 1100 is adapted to receive a boss formed on the tire sensor device 1110.

A bottom surface 1106 of the tire sensor dock 1100 is further adapted to be affixed to the inner surface of a tire. In some embodiments, the tire sensor dock 1100 is made of natural rubber. The tire sensor dock 1100 is affixed and chemically bonded to the tire using a gum (e.g., a rubber vulcanizing cement) that cross-links with inner surface of the tire (e.g., thus, the tire sensor dock 1100 is permanently affixed to the tire). The durometer of the rubber of the tire sensor dock 1100 is similar to that of a tire after vulcanization (e.g., ranges between 40-80 depending on the stiffness required). In some embodiments, the tire sensor dock 1100 has a similar stiffness (e.g., within 5% or within 10%) to that of the tire so that the tire sensor dock 1100 flexes in a similar manner as the tire as it is rolling on the ground. Having a similar stiffness as the tire reduces shear stresses between the tire and the sensor dock caused by vibrations while in use and increases the lifespan of the tire sensor dock 1100 (e.g., the tire sensor dock 1100 can withstand speeds up to 300 mph and is designed to last at least 5 years).

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

It will also be understood that, although the terms first, second, etc., are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

What is claimed is:

1. A tire sensor device for monitoring a condition of a tire, the tire sensor device comprising:
   a plurality of sensors including a temperature sensor and a three-axis accelerometer having a first predetermined axis, wherein said first predetermined axis of said accelerometer is installed in a direction aligned with a circumference of a tire such that said accelerometer of the tire sensor device is aligned along a known axis with respect to the tire;
   memory configured to store data received by the plurality of sensors;
   a microprocessor coupled with the memory, the microprocessor configured to perform one or more initial processing operations on the data received by the plurality of sensors, the one or more initial processing operations including determining one or more tire characteristics using data from the plurality of sensors acquired at a frequency greater than a frequency of rotation of the tire; and
   an antenna, coupled with the microprocessor, configured to wirelessly communicate with one or more external devices;
   wherein the tire sensor device has dimensions less than 5 cm×5 cm×2 cm; and
   wherein the one or more initial processing operations include determining, using data from the accelerometer relating to the periodic motion of the tire along an axis of rotation of the tire, and then analyzing motion of the tire as determined by said data from the accelerometer to determine a wheel misalignment.

2. The tire sensor device of claim 1, wherein the one or more initial processing operations include determining, using data from the plurality of sensors, a duration of a rotation of the tire.

3. The tire sensor device of claim 1, wherein the microprocessor is configured to identify, using data from the plurality of sensors, a plurality of individual rotations of the tire.

4. The tire sensor device of claim 1, further including a voltage regulator adapted to regulate a voltage provided to the antenna.

5. The tire sensor device of claim 1, wherein the antenna is adapted to communicate in an industrial, scientific and medical (ISM) radio band.

6. The tire sensor device of claim 1, wherein the accelerometer has a sampling rate of at least 3000 Hz.

7. The tire sensor device of claim 1, wherein the plurality of sensors further includes a pressure sensor.

8. The tire sensor device of claim 1, wherein the tire sensor device is adapted to be disposed on an inner surface of the tire opposite a tread.

9. The tire sensor device of claim 1, wherein the one or more initial processing operations include determining, using data from the plurality of sensors, a length of a footprint of the tire.

10. The tire sensor device of claim 1, wherein the one or more initial processing operations include determining, using data from the plurality of sensors, the presence of a slow leak in the tire.

11. The tire sensor device of claim 1, wherein the one or more initial processing operations include determining, using data from the plurality of sensors, the presence of a puncture in the tire.

12. The tire sensor device of claim 1, wherein the one or more initial processing operations include determining, using data from the plurality of sensors, a condition of rubber decay.

13. The tire sensor device of claim 1, wherein the one or more initial processing operations include determining, using data from the plurality of sensors, a condition of low tread depth.

14. The tire sensor device of claim 1, wherein the one or more initial processing operations include determining, using data from the plurality of sensors, an excessive load on the tire.

15. The tire sensor device of claim 1, wherein the one or more initial processing operations include determining, using data from the plurality of sensors, that a mileage limit of the tire has been exceeded.

\* \* \* \* \*